(12) United States Patent
Al Ibrahim et al.

(10) Patent No.: US 12,435,613 B2
(45) Date of Patent: Oct. 7, 2025

(54) QUANTITATIVE DISTANCE-BASED LIGHT HYDROCARBON MEASUREMENTS CORRELATIONS AND GRAPH THEORY FOR DETERMINING RESERVOIR COMPLEXITY

(71) Applicant: SAUDI ARABIAN OIL COMPANY, Dhahran (SA)

(72) Inventors: Mustafa Ali H. Al Ibrahim, Safwa (SA); Mariam Assadeq, Dhahran (SA); Bandar Ismail Ghassal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 287 days.

(21) Appl. No.: 18/458,596

(22) Filed: Aug. 30, 2023

(65) Prior Publication Data
US 2025/0075607 A1    Mar. 6, 2025

(51) Int. Cl.
*E21B 44/00*    (2006.01)
*E21B 41/00*    (2006.01)
(Continued)

(52) U.S. Cl.
CPC .............. *E21B 44/00* (2013.01); *E21B 41/00* (2013.01); *E21B 49/08* (2013.01); *G01N 33/241* (2013.01);
(Continued)

(58) Field of Classification Search
CPC ........ E21B 2200/20; E21B 7/04; E21B 44/00; E21B 49/08
See application file for complete search history.

(56) References Cited

U.S. PATENT DOCUMENTS

| | | |
|---|---|---|
| 7,584,086 B2 | 9/2009 | Frankel |
| 11,048,018 B2 | 6/2021 | Fung et al. |

(Continued)

FOREIGN PATENT DOCUMENTS

WO    2022/103801 A1    5/2022

OTHER PUBLICATIONS

Agilent Technologies, "Agilent 7890 Series Gas Chromatograph"; Advanced Operation Manual; pp. 3-245; 2013 (246 pages).
(Continued)

*Primary Examiner* — Yuzhen Shen
(74) *Attorney, Agent, or Firm* — Osha Bergman Watanabe & Burton LLP

(57) ABSTRACT

A method for, at least, forming a graph representation of physical samples and identifying clusters of the physical samples. The method includes obtaining a plurality of physical samples from one or more wells, where each sample is associated with spatial-temporal data, and determining geochemical data for each sample. The method further includes constructing a graph representation of the plurality of physical samples, where in the graph representation each sample is represented as a node and a presence of an edge between any two nodes is based on the spatial-temporal data of the plurality of physical samples. The method further includes determining a weight for every edge in the graph representation and processing the graph representation with a graph-based algorithm to determine one or more clusters. The method may further include determining a wellbore plan that comprises a planned wellbore path to penetrate a hydrocarbon reservoir based on the determined clusters.

20 Claims, 18 Drawing Sheets

(51) Int. Cl.
  *E21B 49/08*   (2006.01)
  *G01N 33/24*   (2006.01)
  *G06T 11/20*   (2006.01)
  *E21B 7/04*    (2006.01)

(52) U.S. Cl.
  CPC ............... *G06T 11/206* (2013.01); *E21B 7/04* (2013.01); *E21B 2200/20* (2020.05)

(56) References Cited

U.S. PATENT DOCUMENTS

| | | | |
|---|---|---|---|
| 2021/0165938 A1 | 6/2021 | Bailey et al. | |
| 2022/0129788 A1* | 4/2022 | Zhang | E21B 49/00 |
| 2022/0137245 A1* | 5/2022 | Nivlet | G01V 1/32 |
| | | | 702/6 |
| 2022/0253726 A1* | 8/2022 | Anifowose | G06N 20/00 |

OTHER PUBLICATIONS

Agilent Technologies, "Agilent 7890A Gas Chromatograph"; Operating Guide; pp. 3-68; 2010 (84 pages).

De Araujo, Patricia Lopes Barros et al., "Diamondoids: occurence in fossil fuels, applications in petroleum exploration and fouling in petroleum production. A review paper"; International Journal of Oil, Gas and Coal Technology; vol. 5; No. 4; pp. 316-367; 2012 (52 pages).

Barber, C. Bradford et al., "The Quickhull Algorithm for Convex Hulls"; ACM Transactions on Mathematical Software; vol. 22, Issue 4; pp. 469-483; Dec. 1996 (15 pages).

Bartle, Keith D. et al., "History of gas chromatography"; TrAC Trends in Analytical Chemistry; vol. 21, Issues 9-10; pp. 547-557; Sep. 10, 2022 (11 pages).

Blondel, Vincent D et al., "Fast unfolding of communities in large networks"; Journal of Statistical Mechanics: Theory and Experiment; vol. 2008, No. 10, Article P10008; pp. 1-12; Oct. 2008 (12 pages).

Clauset, Aaron et al., "Finding community structure in very large networks"; Physical Review E; vol. 70, Issue 6, Article 066111; pp. 066111-1-066111-6; Dec. 2004 (6 pages).

Elson, Phil et al., "SciTools/cartopy: v0.21.1"; Dec. 12, 2022; <https://zenodo.org/record/7430317>; Accessed Aug. 29, 2023 (5 pages).

Gade, Kenneth, "A Non-singular Horizontal Position Representation"; The Journal of Navigation; vol. 63, Issue 3; pp. 395-417; Jul. 2010 (23 pages).

Halpern, Henry I., "Development and Applications of Light-Hydrocarbon-Based Star Diagrams"; AAPG Bulletin; vol. 79, No. 6; pp. 801-815; Jun. 1995 (15 pages).

Harris, Charles R et al., "Array programming with NumPy"; Nature; vol. 585; pp. 357-362; Sep. 17, 2020 (6 pages).

Hunt, John M., "Generation and Migration of Light Hydrocarbons"; Science; vol. 226, Issue 4680; pp. 1265-1270; Dec. 14, 1984 (6 pages).

Hunter, John D., "Matplotlib: a 2D Graphics Environment"; Computing in Science & Engineering; vol. 9, Issue 3; pp. 90-95; May-Jun. 2007 (6 pages).

Kernighan, B. W. et al., "An Efficient Heuristic Procedure for Partitioning Graphs"; Bell System Technical Journal; vol. 49, Issue 2; pp. 291-307; Feb. 1970 (17 pages).

Kruskal, Joseph B., Jr., "On the Shortest Spanning Subtree of a Graph and the Traveling Salesman Problem"; Proceedings of the American Mathematical Society; vol. 7, No. 1; pp. 48-50; Feb. 1956 (3 pages).

Lukes, J. A., "Efficient Algorithm for the Partitioning of Trees"; IBM Journal of Research and Development; vol. 18, Issue 3; pp. 217-224; May 1974 (8 pages).

Mango, Frank D., "The light hydrocarbons in petroleum: a critical review"; Organic Geochemistry; vol. 26, Issues 7-8; pp. 417-440; Apr.-May 1997 (24 pages).

Nespeca, Maurilio Gustavo et al., "Ultra-fast gas chromatographic with flame ionization detector (UFGC-FID) and sonication methods for determination of total petroleum hydrocarbons fractions and BTEX in soil"; Microchemical Journal; vol. 150, Article 104163; pp. 1-9; Nov. 2019 (9 pages).

O'Callaghan, Sean et al., "PyMS: a Python toolkit for processing of gas chromatography-mass spectrometry (GC-MS) data. Application and comparative study of selected tools"; BMC Bioinformatics; vol. 13, Article No. 115; pp. 1-18; May 2012 (18 pages).

Chew, L. Paul, "Constrained Delaunay Triangulations"; Algorithmica; vol. 4, Issue 1-4; pp. 97-108; Jun. 1989 (12 pages).

Peters, Ken E. et al., "Applications of petroleum geochemistry to exploration and reservoir management"; Organic Geochemistry; vol. 33, Issue 1; pp. 5-36; Jan. 2022 (32 pages).

Scarselli, Franco et al., "The Graph Neural Network Model"; IEEE Transactions on Neural Networks; vol. 20, Issue 1; pp. 61-80; Jan. 2009 (20 pages).

Virtanen, Pauli et al., "SciPy 1.0: fundamental algorithms for scientific computing in Python"; Nature Methods; vol. 17; pp. 261-272; Mar. 2020 (15 pages).

Wu, Zonghan et al., "A Comprehensive Survey on Graph Neural Networks"; IEEE Transactions on Neural Networks and Learning Systems; vol. 32, Issue 1; pp. 4-24; Jan. 2021 (21 pages).

Zhou, Jie et al., "Graph neural networks: A review of methods and applications"; AI Open; vol. 1; pp. 57-81; 2020 (25 pages).

Branets, Larisa V. et al., "Challenges and Technologies in Reservoir Modeling"; Communications in Computational Physics; vol. 6, Issue 1; pp. 1-23; Jul. 2009 (23 pages).

Dashtian, Hassan et al., "Analysis of Cross Correlations Between Well Logs of Hydrocarbon Reservoirs"; Transport in Porous Media; vol. 90, Issue 2; pp. 445-464; Nov. 2011 (20 pages).

* cited by examiner

QUANTITATIVE DISTANCE-BASED LIGHT HYDROCARBON MEASUREMENTS CORRELATIONS AND GRAPH THEORY FOR DETERMINING RESERVOIR COMPLEXITY

BACKGROUND

Oil and gas extraction from subsurface rock formations requires the drilling of wells using drilling rigs mounted on the ground or on offshore rig platforms. Once drilled, the wells may access hydrocarbon reservoirs. In the context of oil and gas exploration and production, a variety of tools and methods are employed to model subsurface regions and plan wellbore paths to extract desired hydrocarbons. Reservoir characterization, such as assessments of reservoir quality and production estimates, is typically performed using one or more models of the subsurface over a region of interest in conjunction with a computational simulation (e.g., using a reservoir simulator).

Understanding hydrocarbon reservoir complexity and heterogeneity involves gaining a solid knowledge of hydrocarbon source, migration, and subsequent degradation. One such class of techniques for initial and ongoing reservoir characterization includes the geochemical analysis of various hydrocarbon samples collected at one or more oil and gas fields. Geochemical analysis may include light hydrocarbon gas chromatography and water elemental analysis (e.g., from X-ray fluorescence experiments).

Conventionally, results of a geochemical analysis are qualitatively compared between samples by a subject matter expert. Because comparisons of samples rely on the expertise of individuals, these comparisons are often inconsistent and can be misleading resulting in a poor reservoir characterization.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for, at least, forming a graph representation of physical samples and clustering the physical samples represented as in the graph. The method includes obtaining a plurality of physical samples from one or more wells, where each sample is associated with spatial-temporal data, and determining geochemical data for each sample in the plurality of physical samples. The method further includes constructing a graph representation of the plurality of physical samples, where in the graph representation each sample is represented as a node and a presence of an edge between any two nodes is based on the spatial-temporal data of the plurality of physical samples. The method further includes determining a weight for every edge in the graph representation and processing the graph representation with a graph-based algorithm to determine one or more clusters, where each of the one or more clusters includes at least one sample from the plurality of physical samples. The method may further include determining a wellbore plan that comprises a planned wellbore path to penetrate a hydrocarbon reservoir based on the determined clusters.

Embodiments disclosed herein generally relate to a non-transitory computer-readable memory that includes computer-executable instructions stored thereon that, when executed on a processor, cause the processor to perform certain steps. The steps include obtaining a plurality of physical samples from one or more wells, where each sample is associated with spatial-temporal data, and determining geochemical data for each sample in the plurality of physical samples. The steps further include constructing a graph representation of the plurality of physical samples, where in the graph representation each sample is represented as a node and a presence of an edge between any two nodes is based on the spatial-temporal data of the plurality of physical samples. The steps further include determining a weight for every edge in the graph representation and processing the graph representation with a graph-based algorithm to determine one or more clusters, where each of the one or more clusters includes at least one sample from the plurality of physical samples. The steps may further include determining a wellbore plan that comprises a planned wellbore path to penetrate a hydrocarbon reservoir based on the determined clusters.

Embodiments disclosed herein generally relate to a system including a sample characterization system configured to receive a physical sample and determine geochemical data describing the physical sample and a computer. The computer is configured to receive geochemical data for each sample in a plurality of physical samples, where each sample is associated with spatial-temporal data, and construct a graph representation of the plurality of physical samples, where in the graph representation each sample is represented as a node and a presence of an edge between any two nodes is based on the spatial-temporal data of the plurality of physical samples. The computer is further configured to determine a weight for every edge in the graph representation and process the graph representation with a graph-based algorithm to determine one or more clusters, where each of the one or more clusters includes at least one sample from the plurality of physical samples. The computer may further be configured to determine a wellbore plan that comprises a planned wellbore path to penetrate a hydrocarbon reservoir based on the determined clusters.

Other aspects and advantages of the claimed subject matter will be apparent from the following description and the appended claims.

DETAILED DESCRIPTION

Figure 1:
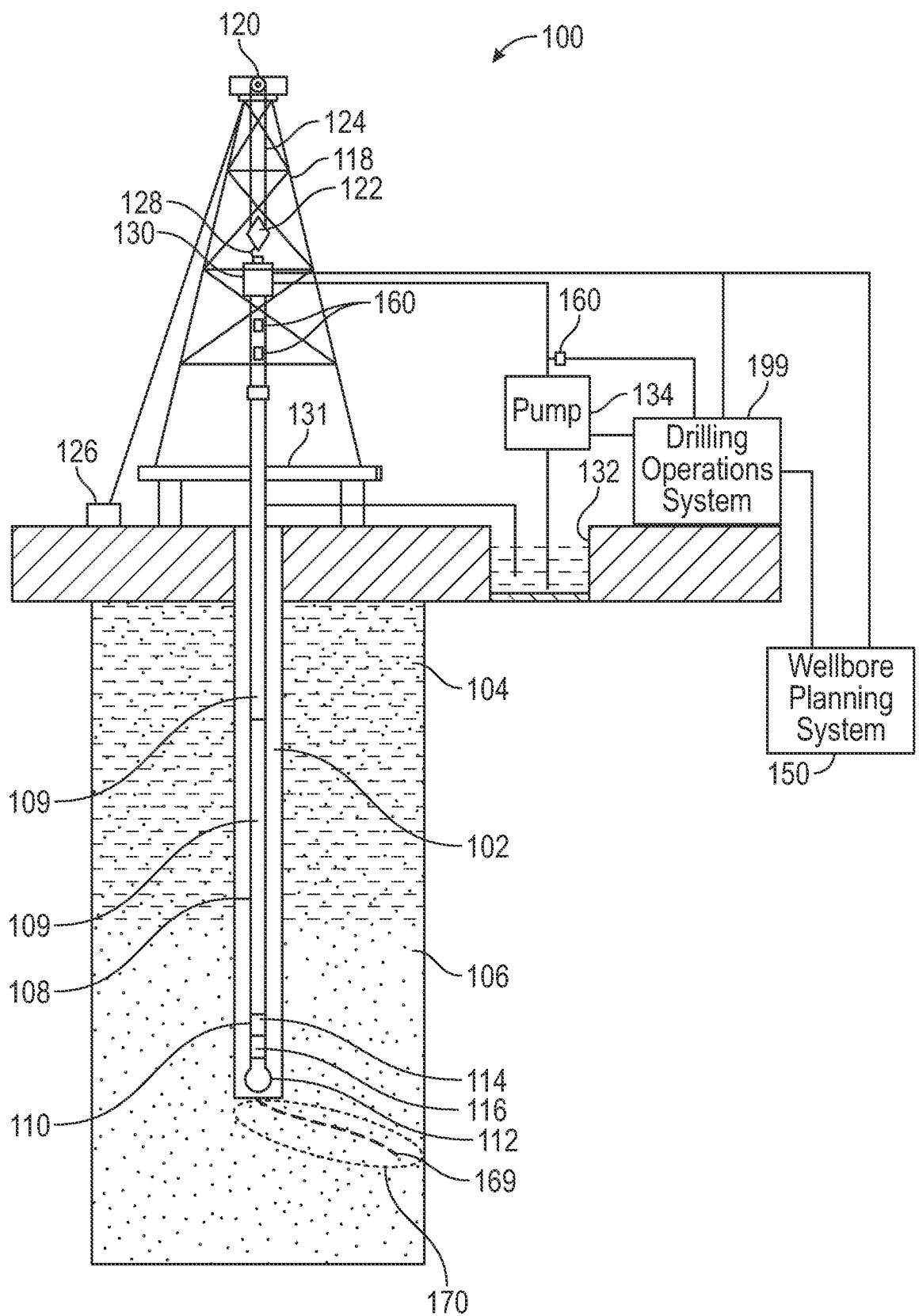
FIG. 1 depicts a well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-17, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Decisions regarding how best to produce oil and gas from one or more reservoirs, including planning the location of wells and altering process parameters over time to maximize production, are dependent on accurate subsurface models. For example, one or more subsurface models may be used by reservoir simulator or other estimation method to forecast the production of a well and reservoir performance. In particular, it is important to characterize the compartmentalization of the subsurface. For example, if an oil and gas field is considered to have two disconnected compartments rather than one, it is necessary to plan and drill wells to intersect or penetrate compartments to produce the available hydrocarbons. Similarly, understanding compartmentalization of the subsurface is important to develop injection strategies to optimize production and maximize injection efficiency.

Embodiments disclosed herein relate to an automated and quantitative reservoir complexity analysis system that determines, at least in part, patterns, similarities, and groups among samples associated with a subsurface and/or at least one hydrocarbon reservoir. As will be described herein, samples may include hydrocarbon and/or water samples collected from one or more wells of an oil and gas field. The samples may be given a spatial and/or temporal designation. That is, a sample may be collected from a well with a known location (e.g., specified using a two-dimensional (2D) coordinate system), at a given depth of the well, at a given time. Samples may be characterized, or described using a quantitative and/or qualitative set of features, using any sample characterization method. For example, hydrocarbon samples may be characterized using gas chromatography and water samples may be characterized using water elemental analysis (e.g., X-ray fluorescence). In one or more embodiments, the automated and quantitative reservoir complexity analysis system constructs a graph representation of the samples based on the spatial-temporal designation of the samples and weights (or assigns a value to) connecting edges in the graph representation according to the results of the sample characterization. In one or more embodiments, the graph representation is processed by, at least, a graph partitioning algorithm to determine clusters or groups of related samples. The groups of samples may, in turn, be used to identify subsurface compartments (e.g., distinct hydrocarbon sources) and determine subsurface fluid migration. Knowledge of reservoir complexity, including compartmentalization, may be used with one or more simulation techniques (e.g., reservoir simulator, basin system simulator, petroleum system simulator, etc.) to accurately predict quantities of interest (e.g., production forecasting, wellbore planning, etc.).

FIG. 1 illustrates an example well site (100). A well site (100) may be used to extract oil and gas, generally referred to as hydrocarbons, from underground reservoirs. In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102).

The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools (114), such as a measurement-while-drilling (MWD) tool and logging-while-drilling (LWD) tool. Measurement tools (114) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called "mud") may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)). Drilling fluid (or mud) is any fluid that is circulated in the wellbore (102) to aid in the drilling operation. Drilling fluids may be broadly categorized according to their principal constituent. For example, a drilling fluid may be said to be an oil-based mud (OBM), water-based mud (WBM), brine-based fluid, or synthetic-based fluid. The base component for a water-based drilling fluid (or WBM) may be fresh water, seawater, brine, saturated brine, or a formate brine. The liquid part of a drilling fluid is known as "mud filtrate." When a drilling fluid passes through a porous medium (e.g., subsurface formation (104, 106)), solid particulates suspended in the drilling fluid may become separated from the mud filtrate. Solid particulates, upon separation, may accumulate and form a layer commonly known as "mudcake." Some well sites (100) may include a drilling fluid processing system (not shown in FIG. 1). The drilling fluid processing system may include hardware and/or software with functionality for automatically supplying and/or mixing weighting agents, buffering agents, rheological modifiers, and/or other additives to the drilling fluid until it matches and/or satisfies one or more desired drilling fluid properties. In other words, the composition of a drilling fluid may be complex and a drilling fluid may be tailored to a specific well site (100), and, in some instances, the composition of a drilling fluid may be altered in real-time according to the needs of a drilling operation.

In some implementations, a drilling operations system (199) may be disposed at or communicate with the well site (100). Drilling operations system (199) may control at least a portion of a drilling operation at the well site (100) by providing controls to various components of the drilling operation. In one or more embodiments, drilling operations system (199) may receive data from one or more sensors (160) arranged to measure controllable parameters of the drilling operation. As a non-limiting example, sensors (160) may be arranged to measure: weight on bit (WOB), drill string rotational speed (e.g., rotations per minute (RPM)), flow rate of the mud pumps (e.g., in the units of gallons per minute (GPM)), and rate of penetration of the drilling operation (ROP). In one or more embodiments, the drilling operation may be controlled by the drilling operations system (199).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In some implementations, the drilling motor is a positive displacement motor (116) located on the distal end of the drill string (108) as part of the BHA (110). In further embodiments, the drill bit (112) may be rotated using a combination of the drilling motor, such as a positive displacement motor (116), and the top drive (130) (or a rotary swivel if a rotary table is used instead of a top drive to rotate the drill string (108)). While cutting rock with the drill bit (112), mud is pumped into the drill string (108).

The drilling fluid flows down the drill string (108) and exits into the bottom of the wellbore (102) through nozzles in the drill bit (112). The drilling fluid in the wellbore (102) then flows back up to the surface in an annular space between the drill string (108) and the wellbore (102) with entrained cuttings.

The drilling fluid with the cuttings is returned to the pit (132) to be circulated back again into the drill string (108). Typically, the cuttings are removed from the drilling, and the drilling fluid is reconditioned as necessary, before pumping the drilling fluid again into the drill string (108).

Depending on the depth of hydrocarbon bearing formation and other geological complexes, a well can have several hole sizes before it reaches its target depth. A steel pipe, or casing (not shown), may be lowered in each hole and a cement slurry may be pumped from the bottom up through the presumably annular space between the casing and the wellbore (102) to fix the casing, seal the wellbore from the surrounding subsurface (104, 106) formations, and ensure proper well integrity throughout the lifecycle of the well. The casing may be inserted periodically while drilling out the well.

Upon finishing drilling the wellbore (102), the well may undergo a "completions" process to stabilize the well and provide reliable access to the desired hydrocarbons. In some implementations, the final wellbore (102) can be completed using either cased and cemented pipe, which is later perforated to access the hydrocarbon, or it may be completed using a multi-stage open-hole packers assembly. Once completed, a well site (100) may be used in production to extract hydrocarbons from underground reservoirs.

As shown in FIG. 1, the wellbore (102) may be drilled according to a wellbore path (169). The wellbore path (169), and thus the wellbore (102) upon drilling, may traverse and/or intersect a target zone (170), or "pay zone," that may include a hydrocarbon reservoir within the subsurface. In general, the wellbore path (169) may be a curved wellbore path, or a straight wellbore path. All or part of the wellbore path (169) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the target zone (170), e.g., a targeted hydrocarbon-bearing formation, and a planned wellbore path (169) from the starting location to the terminal location. In other words, the wellbore path (169) may intersect a previously located hydrocarbon reservoir.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. In accordance with one or more embodiments, the wellbore plan is informed by knowledge of reservoir complexity and subsurface compartmentalization determined through a graph-based analysis (i.e., the automated and quantitative reservoir complexity analysis system).

The wellbore plan may include wellbore geometry information such as wellbore diameter and inclination angle. If casing (not shown in FIG. 1) is used, the wellbore plan may include casing type or casing depths. Furthermore, the wellbore plan may consider other engineering constraints such as the maximum wellbore curvature ("dog-log") that the drillstring (108) may tolerate and the maximum torque and drag values that the drilling system (100) may tolerate.

A wellbore planning system (150) may be used to generate the wellbore plan. The wellbore planning system (150) may include one or more computer processors in communication with computer memory containing any geophysical models, geomechanical models, knowledge of reservoir complexity and subsurface compartmentalization, and information relating to drilling hazards, and the constraints imposed by the limitations of the drillstring (108) and the drilling system (100). The wellbore planning system (150) may further include dedicated software to determine the planned wellbore path (169) and associated drilling parameters, such as the planned wellbore diameter, the location of planned changes of the wellbore diameter, the planned depths at which casing will be inserted to support the wellbore (102) and to prevent formation fluids entering the wellbore, and the drilling mud weights (densities) and types that may be used during drilling the wellbore.

Finally, it is noted that to start drilling, or "spudding in" a new well, the hoisting system lowers the drillstring (108) suspended from the derrick (118) towards the planned surface location of the wellbore (102). An engine, such as a diesel engine, may be used to supply power to the top drive (130) to rotate the drillstring (108). The weight of the drillstring (108) combined with the rotational motion enables the drill bit (112) to bore the wellbore (102).

In many situations, the near-surface is typically made up of loose or soft sediment or rock, so large diameter casing, e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface of the earth.

Drilling may continue without any casing once deeper, or more compact rock is reached. While drilling, a drilling mud system may pump drilling mud from a mud tank (or the mud pit (132)) on the surface through the drill pipe (109). Drilling mud serves various purposes, including pressure equalization, removal of rock cuttings, and drill bit cooling and lubrication.

At planned depth intervals, drilling may be paused and the drillstring (108) withdrawn from the wellbore. Sections of casing may be connected and inserted and cemented into the wellbore. Casing string may be cemented in place by pumping cement and mud, separated by a "cementing plug," from the surface through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

Figure 2:
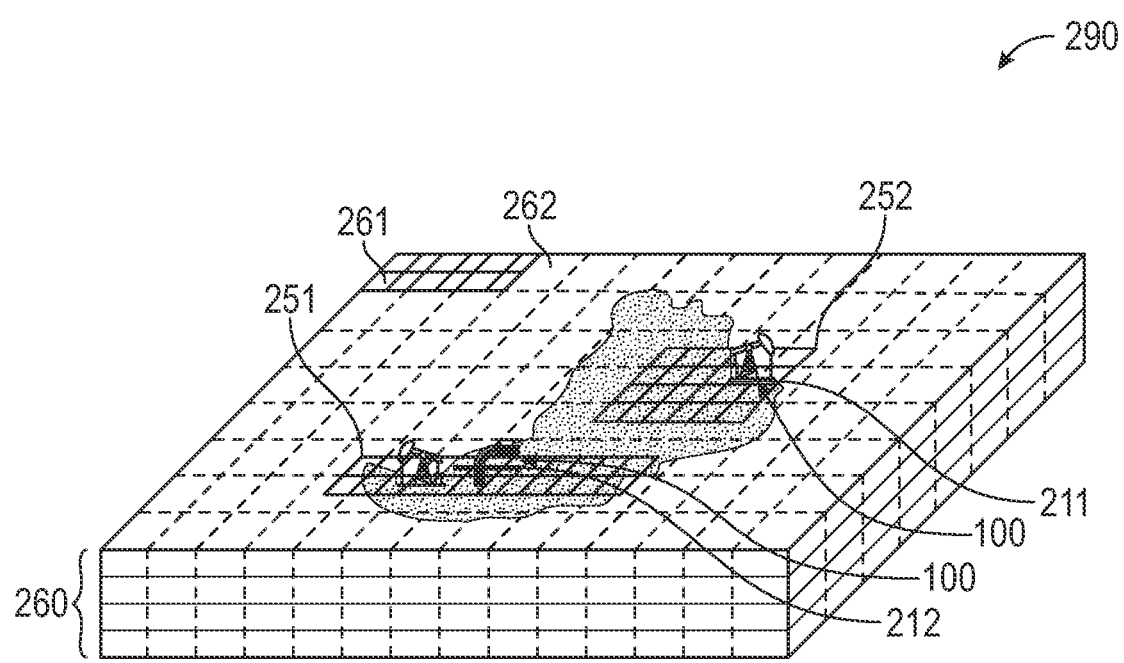
FIG. 2 depicts a grid model of a reservoir simulator in accordance with one or more embodiments.

In accordance with one or more embodiments, and as described later in the instant disclosure, the automated and quantitative reservoir complexity system may be used to inform, or in conjunction with, a reservoir simulator. Turning to FIG. 2, FIG. 2 shows the basis of a reservoir simulator in accordance with one or more embodiments. FIG. 2 shows a reservoir grid model (290) that corresponds to a geological region. The geological region may span multiple well sites (100) and a subsurface region of interest. The well sites (100) may include injection wells (212), which inject a fluid into the local subsurface formations (104, 106), or an extraction well (211). More specifically, the reservoir grid model (290) includes grid cells (261) that may refer to an original cell of a reservoir grid model as well as coarse grid blocks (262) that may refer to an amalgamation of original cells of the reservoir grid model. For example, a grid cell may be the case of a 1×1 block, where coarse grid blocks may be of sizes 2×2, 4×4, 8×8, etc. Both the grid cells (261) and the coarse grid blocks (262) may correspond to columns for multiple model layers (260) within the reservoir grid model (290).

Prior to performing a reservoir simulation, local grid refinement and coarsening (LGR) may be used to increase or decrease grid resolution in a certain area of reservoir grid model (290). For example, various reservoir properties, e.g., permeability, porosity or saturations, may correspond to a discrete value that is associated with a particular grid cell or coarse grid block. However, by using discrete values to represent a portion of a geological region, a discretization error may occur in a reservoir simulation. Thus, finer grids may reduce discretization errors as the numerical approximation of a finer grid is closer to the exact solution, however through a higher computational cost. As shown in FIG. 2, for example, the reservoir grid model (290) may include various fine-grid models (i.e., fine-grid model A (251), fine-grid model B (252)), that are surrounded by coarse block regions. Likewise, the original reservoir grid model (290) without any coarsening may also be a fine-grid model. In some embodiments, a reservoir grid model (or multiple reservoir grid models) may be used to preform reservoir simulations.

Generally, reservoir simulators solve a set of mathematical governing equations that represent the physical laws that govern fluid flow in porous, permeable media. For example, the flow of a single-phase slightly compressible oil with a constant viscosity and compressibility, equations that capture Darcy's law, the continuity condition, and the equation of state and may be written as:

$$\nabla^2 p(x,t) = \frac{\psi \mu c_t}{k} \frac{\partial p(x,t)}{\partial t}, \qquad (1)$$

where $\rho$ represents fluid in the reservoir, x is a vector representing spatial position and t represents time. $\psi$, $\mu$, $c_t$, and k represent the physical and petrophysical properties of porosity, fluid viscosity, total combined rock and fluid compressibility, and permeability, respectively. $\nabla^2$ represents the spatial Laplace operator.

Additional, and more complicated equations are required when more than one fluid, or more than one phase, e.g., liquid and gas, are present in the reservoir. Further, when the physical and petrophysical properties of the rocks and fluids vary as a function of position the governing equations may not be solved analytically and must instead be discretized into a grid of cells or blocks (as depicted in FIG. 2). The governing equations must then be solved by one of a variety of numerical methods, such as, without limitation, explicit or implicit finite-difference methods, explicit or implicit finite element methods, or discrete Galerkin methods.

In some embodiments, a reservoir simulator includes functionality for simulating the flow of fluids, including hydrocarbon fluids such as oil and gas, through a hydrocarbon reservoir composed of porous, permeable reservoir rocks in response to natural and anthropogenic pressure gradients. The reservoir simulator may be used to predict changes in fluid flow, including fluid flow into well penetrating the reservoir as a result of planned well drilling, and fluid injection and extraction. For example, the reservoir simulator may be used to predict changes in hydrocarbon production rate that would result from the injection of water into the reservoir from wells around the reservoirs periphery.

A reservoir simulator may account for, among other things, the porosity and hydrocarbon storage capacity of the subsurface formations (104, 106) and fluid transport pathways to predict the production rate of hydrocarbons of a well, or a set of wells, over their lifetime.

Under consideration of wellbore planning systems (150), reservoir simulators, and drilling operations, the need for accurate subsurface models is self-evident. Accurate subsurface models are important to reduce exploration risks, plan the location of well sites (100) (i.e., wellbore planning system (150)), optimize reservoir production, improve reservoir characterization, best leverage existing discoveries, and better extend hydrocarbon recovery from existing wells. Generally, a subsurface model contains a digital description of the physical properties of the rocks as a function of position within the subsurface region of interest and the fluids within the pores of the porous, permeable reservoir rocks at a given time. In some embodiments, the digital description may be in the form of a dense three-dimensional (3D) grid with the physical properties of the rocks and fluids defined at each node. In some embodiments, the 3D grid may be a cartesian grid, while in other embodiments the grid may be an irregular grid. For example, subsurface models may indicate the porosity and permeability throughout a subsurface volume in a region of interest (e.g., near or encompassing a reservoir and/or wellbore). Hereafter, to promote generality, the term "subsurface model" will be adopted to refer to the digital representation of one or more subsurface properties (e.g., petrophysical, thermodynamic, etc.) for a subsurface region of interest, where no restriction is placed on the grid format (e.g., 3D, regular, cartesian).

The physical properties of the rocks and fluids within the reservoir may be obtained from a variety of geological and geophysical sources. For example, remote sensing geophysical surveys, such as seismic surveys, gravity surveys, and active and passive source resistivity surveys, may be employed. In addition, data collected such as well logs (from measurement tools (114, 116)) and production data acquired in wells penetrating the reservoir may be used to determine physical and petrophysical properties along the segment of the well trajectory traversing the reservoir. For example, porosity, permeability, density, seismic velocity, and resistivity may be measured along these segments of wellbore. Data collected from previously drilled, nearby wells, sometimes called "offset" wells, may also be appended to the collected data. Moreover, so-called "soft" data, such as outcrop information and data describing analogous modern geological or depositional environments may be integrated with the acquired well site (100) data and seismic data to further refine the modeled subsurface formations (104, 106). In accordance with some embodiments, remote sensing geophysical surveys and physical and petrophysical properties determined from well logs may be combined to estimate physical and petrophysical properties for the entire reservoir grid model (290).

Figure 3:
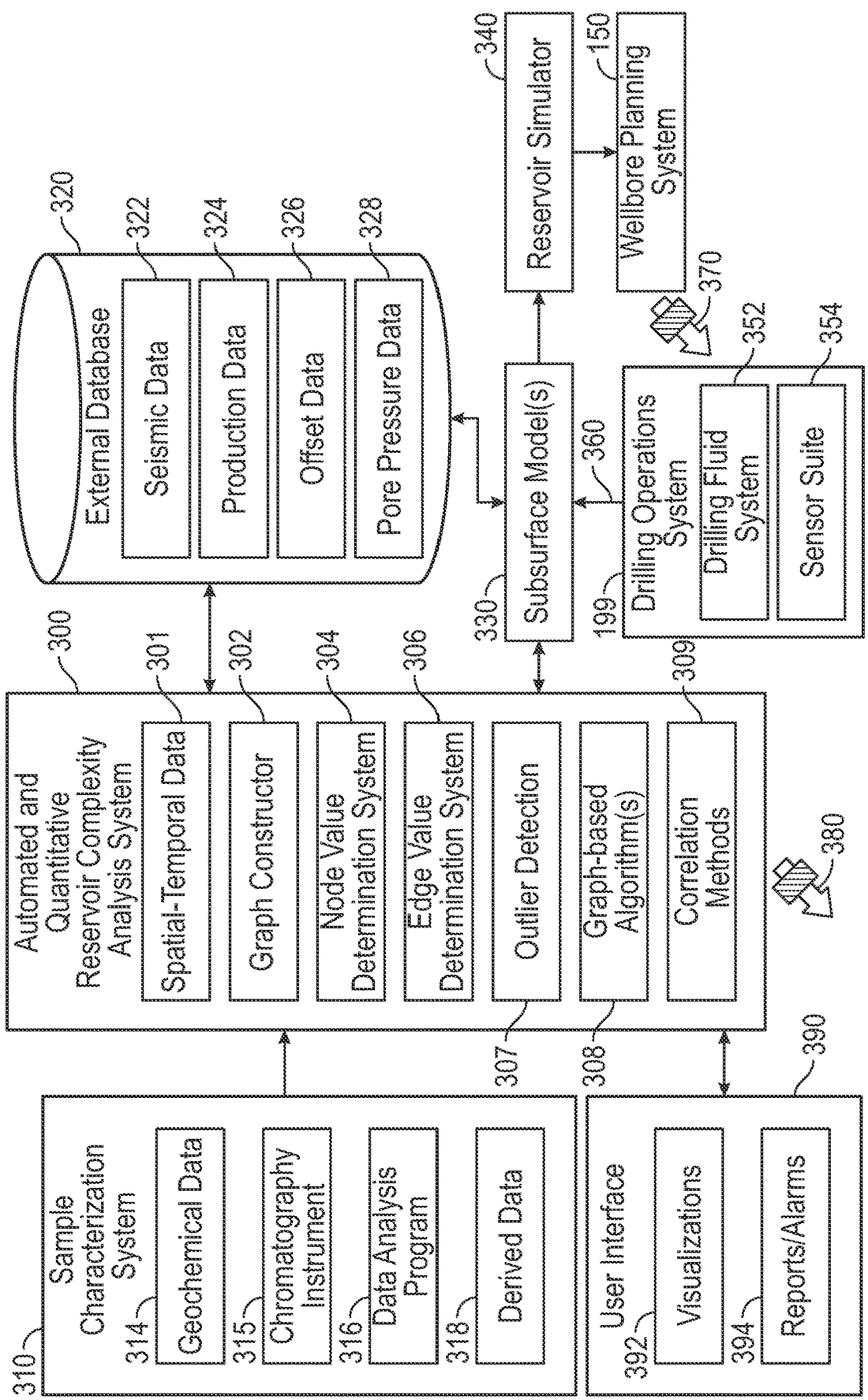
FIG. 3 depicts a block diagram in accordance with one or more embodiments.

FIG. 3 depicts a block diagram of the automated and quantitative reservoir complexity analysis system (300) and its interaction with surrounding systems, in accordance with one or more embodiments. In FIG. 3, the automated and quantitative reservoir complexity analysis system (300) is depicted as being comprised of various components, modules, and/or subsystems, where the components, modules, and/or subsystems may interact with each other. Further, in FIG. 3, the automated and quantitative reservoir complexity analysis system (300) is shown to interact with additional surrounding systems. One with ordinary skill in the art will recognize that the partitioning, organization, and interaction of the components, modules, and/or subsystems of the automated and quantitative reservoir complexity analysis system (300), alongside interactions with surrounding systems, in FIG. 3 is intended to promote clear discussion and should not be considered fixed or limiting. For example, FIG. 3 depicts a sample characterization system (310) as an independent entity, however, in some embodiments, the sample characterization system (310)—its data and/or its functionality—may be encompassed by the automated and quantitative reservoir complexity analysis system (300). Further, the automated and quantitative reservoir complexity analysis system (300) may store data objects and/or include a database such as the external database (320).

As depicted in FIG. 3 and in accordance with one or more embodiments, the automated and quantitative reservoir complexity analysis system (300) is communicatively connected to an external database (320). The external database (320) stores digital media, such as data descriptive of one or more material properties and/or processes, associated with a subterranean region of interest of an oil and gas field where the automated and quantitative reservoir complexity analysis system (300) is applied. In one or more embodiments, the external database (320) stores seismic data (322) acquired from a seismic survey conducted over the subterranean region of interest. In one or more embodiments, the external database (320) further includes production data (324) representative of the quantity of hydrocarbons and other material phases (e.g., water) produced from existing wells, if any, of the oil and gas field. In one or more embodiments, the external database further includes offset data (326) (e.g., LWD logs), again, from existing wells, if any, of the oil and gas field. In one or more embodiments, the external database (320) further includes pore pressure data (328) associated with one or more reservoirs within the subterranean region of interest that may be penetrated and traversed by one or more wells of the oil and gas field. The pore pressure data (328) may include an estimate of pore pressures distributed over the one or more reservoirs.

In accordance with one or more embodiments, the automated and quantitative reservoir complexity analysis system (300) is able to access, inform, and alter a subsurface model (330) of the subterranean region of interest (or, more simply, the subsurface). As previously described, a subsurface model (330) is a digital representation of one or more subsurface properties (e.g., petrophysical, thermodynamic, etc.) such as porosity and geomechanical stress. The subsurface model (330) may be constructed using data stored in the external database (320) and updated and/or refined using data acquired while drilling (e.g., LWD logs).

In accordance with one or more embodiments, a reservoir simulator (340) is coupled to the subsurface model (330) and informed by the automated and quantitative reservoir complexity analysis system (300). In one or more embodiments, the reservoir simulator (340) is used to estimate production of a newly proposed well the planned wellbore path for the newly proposed well is base on, at least in part, the results of the automated and quantitative reservoir complexity analysis system (300). The reservoir simulator (340) may use the subsurface model (330) (e.g., a geomechanical stress model) to determine likely hydrocarbon migration and transport pathways and mechanisms in view of the automated and quantitative reservoir complexity analysis system (300).

In accordance with one or more embodiments, the automated and quantitative reservoir complexity analysis system (300) may inform a wellbore planning system (150). As previously described, the wellbore planning system (150) may be used to generate a planned wellbore path for a newly proposed well. In one or more embodiments, the wellbore planning system (150) is in communication with the reservoir simulator (340) and/or the subsurface model (330). The wellbore planning system (150) may control aspects of a drilling operations system (199) (e.g., guiding the drill bit along the planned wellbore path). In one or more embodiments, the wellbore planning system (150) transmits one or more control signals (e.g., command X (370)) to the drilling operations system (199) to control aspects of the drilling process (e.g., direction of the drill bit).

In accordance with one or more embodiments, the automated and quantitative reservoir complexity analysis system (300) controls, at least in part, a drilling operations system (199) like that described in reference to FIG. 1. As previously described, the wellbore planning system (150) may be used to generate a planned wellbore path for a well. In one or more embodiments, the wellbore planning system (150) is in communication with the reservoir simulator (340) and/or the subsurface model (330) that are each connected, directly or indirectly, to the automated and quantitative reservoir complexity analysis system (300). In one or more embodiments, the automated and quantitative reservoir complexity analysis system (300) may directly control aspects of the drilling operations system (199) through transmission of one or more control signals (e.g., command Y (380)).

The drilling operations system (199), in turn, may control at least a portion of a drilling operation at a well site (100) when drilling a well such as providing controls to various components of the drilling operation. In one or more embodiments, drilling operations system (199) may receive data from one or more sensors (160) arranged to measure controllable parameters of the drilling operation. As such, the drilling operations system (199) may be said to include a sensor suite (358). One or more sensors in the sensor suite (354) may be arranged to measure: weight on bit (WOB), drill string rotational speed (e.g., rotations per minute (RPM)), flow rate of the mud pumps (e.g., in the units of gallons per minute (GPM)), and rate of penetration of the drilling operation (ROP). Sensor data (360) may be acquired using the sensor suite (358) and transmitted for use by the subsurface model (330). That is, the subsurface model (330) can be updated using sensor data (360) (e.g., LWD logs).

In one or more embodiments, the drilling operations system (199) further includes a drilling fluid system (352). The drilling fluid system (352) may include hardware and/or software with functionality for automatically supplying and/or mixing weighting agents, buffering agents, rheological modifiers, and/or other additives to the drilling fluid until it matches and/or satisfies one or more desired drilling fluid properties. The drilling fluid system (352) may also be configured to acquire mudlogging data by analyzing and characterizing the properties of drilling fluid that has returned to the surface and its entrained gases and cuttings.

In one or more embodiments, the drilling operations system (199) is configured with, or otherwise enabled, for geosteering. Geosteering may be used to position the drill bit or drill string of the drilling system relative to a boundary between different subsurface layers (e.g., overlying, underlying, and lateral layers of a pay zone) during drilling operations. In particular, the wellbore planning system (150) may communicate geosteering commands (e.g., command X (370)) to the drilling operations system (199) based on well log data updates (e.g., LWD logs) that are further adjusted by the reservoir simulator (340) in view of the automated and quantitative reservoir complexity analysis system (300). As such, the wellbore planning system (150) may generate one or more control signals (e.g., command X (370)) for drilling equipment (or a logging system may generate for logging equipment) based on an updated planned wellbore path. As such, geosteering may use various sensors (e.g., sensor suite (358)) located inside or adjacent to the drill string to determine different rock formations within a well path.

As depicted in FIG. 3, the automated and quantitative reservoir complexity analysis system (300) may be couple to, or be interacted with through, a user interface (390). In one or more embodiments, the user interface (390) is a graphical user interface. The user interface (390) acts as the point of human-computer interaction and communication. Thus, the user interface (390) can receive inputs from a user. The user interface (390) further provides visualizations (392), such as chromatograms, reports, and text and image data, to one or more users. In broad terms, the user interface (390) can include display screens, keyboards, and a computer mouse. In one or more embodiments, the user interface (390) is implemented as a computer program, such as a native application or a web application.

In one or more embodiments, the user interface (390) provides report generation and alarm (394) functionalities. Alarms (394) simply refer to alerting one or more users if a significant change or insight is determined or discovered by the automated and quantitative reservoir complexity analysis system (300). For example, and as will be described in greater detail later in the instant disclosure, if a classification or grouping of samples from a particular well (i.e., samples with the same spatial data) change with time, as determined by the automated and quantitative reservoir complexity analysis system (300), then an alarm (394) may be generated. Alarms (394) may take the form notifications/interactions displayed through the user interface (390) and/or email and SMS notifications.

In general, embodiments of the disclosure include systems and methods for determining similar groupings of samples acquired from an oil and gas field. The samples may be hydrocarbon and/or water samples collected from a well at a given depth and time. Thus, a sample is associated with spatial and/or temporal data. The location of a well may be denoted as $(x_n, y_n)$ where x and y represent axes on the surface of the earth and n indicates an index of a well. For example, an oil and gas field may include N wells such that each well may be assigned and specified by the index n, where $1 \leq n \leq N$. Other well identifiers may be used without limitation. The x and y axes may be orthogonal, such as axes orientated as North-South and East-West, but this need not be the case. In one or more embodiments, the spatial and/or temporal data of a sample may further include a time, t, and/or depth, d, dimension/axis. As such, in general, the spatial-temporal data associated with a sample collected from the $n^{th}$ well may be represented as $(x_n, y_n)$, $(x_n, y_n, d)$, $(x_n, y_n, t)$, or $(x_n, y_n, t, d)$. It is noted that the preceding notation allows for more than one sample to be collected from a well, where the multiple samples collected from a single well may be acquired at different depths, different times, and or a combination of different depths and times. The spatial and/or temporal data associated with all collected samples is depicted in FIG. 3 as spatial-temporal data (301). In one or more embodiments, the format of the spatial and/or temporal data of each sample is identical such that the spatial-temporal data (301) may be organized as a tensor of known rank (e.g., a 2D array where each row represents a well and each column represents a spatial or temporal axis).

In accordance with one or more embodiments, each sample is characterized by a sample characterization system (310). In general, the sample characterization system (310) receives a sample (i.e., a water and/or oil sample collected from a subsurface) and performs one or more analysis methods on the sample to determine at least one property, or characterizing feature, of the sample. Determined properties and/or features of a sample are stored as geochemical data (314). Thus, in one or more embodiments, the sample characterization system (310) produces geochemical data (314) representative of a received sample.

The sample characterization system (310) may perform any geochemical analysis known in the art, or to be known in the art, without limitation. The geochemical analysis may include, but is not limited to, light hydrocarbon analysis, whole hydrocarbon analysis, biomarker analysis, quantitative diamondoid analysis, and isotope analysis. In one or more embodiments, the sample characterization system (310) can perform water elemental analysis (for water samples), for example, using X-ray fluorescence. In addition, in one or more embodiments, basin and petroleum system modeling may be conducted alongside the sample characterization system (310) to confirm, or at least provide some validation, of the resulting geochemical data (314).

In accordance with one or more embodiments, the sample characterization system (310) produces geochemical data (314) for a sample through light hydrocarbon geochemical analysis. Light hydrocarbons are typically considered to be alkanes with a low number of carbon atoms (e.g., 1 to M carbon atoms where M is a commonly accepted cutoff; typically 9). The light hydrocarbons may be referenced using a shorthand notation where a hydrocarbon molecule is referred to using the number of carbon atoms present in the molecule, and some additional information if required. For example, methane ($CH_4$) may be referred to as $C_1$, ethane ($C_2H_6$) as $C_2$, propane ($C_3H_8$) as $C_3$, and so forth. Isopolymers of butane ($C_4H_{10}$) and pentane ($C_5H_{12}$) may require an additional designator when using the shorthand notation (e.g., $nC_5$ and $iC_5$). However, when no ambiguity exists, or when no distinction between molecular variants is made, butane may simply be referred to as $C_4$, pentane as $C_5$, etc. Light hydrocarbons are typically formed in a temperature range bounded by 75° C. and 140° C. In one or more embodiments, the sample characterization system (310) measures light hydrocarbon concentrations for hydrocarbons $C_1$ through $C_9$ in a given sample using gas chromatography.

Chromatography generally refers to the physical separation of a mixture of compounds into its individual components, or compounds. Each compound of a mixture typically has unique chemical and thermophysical properties. As such, in chromatography, compounds are able to be separated because their unique properties cause them to distribute themselves between two phases: a stationary phase and a mobile phase. In general, a mixture is dissolved in a fluid solvent (i.e., the mobile phase), which may be a liquid or a gas. The mobile phase carries the mixture through an object on which the stationary phase is fixed. Suitable objects may include, but are not limited to, a column, a capillary tube, a plate, and a sheet. The constituents of the mixture tend to have different affinities for the stationary phase (due to their unique properties) and are retained for different lengths of time. As a result, the components travel at different apparent velocities in the mobile fluid causing them to separate. As stated, in chromatography, a mixture is separated into its individual components, or compounds, by dissolving the mixture in a mobile phase and passing (e.g., moving, transporting) the mobile phase through a stationary phase. The mobile phase may be a gas or a liquid. Generally, chromatography may further be specified as either "gas chromatography" (GC) or "liquid chromatography" (LC) depending on if the mobile phase is a gas or liquid, respectively.

In one or more embodiments, the sample characterization system (310) includes a chromatography instrument (315). In one or more embodiments, the chromatography instrument (315) is configured to use a liquid stationary phase and a gas mobile, or moving, phase (e.g., a helium carrier gas). As such, in these embodiments, the chromatography instrument (315) performs gas chromatography (GC). In accordance with one or more embodiments, light hydrocarbon measurements are acquired by the chromatography instrument (315) of the sample characterization system (310) and stored as geochemical data (314) using gas chromatography (GC). Gas chromatography (GC) is employed due to its suitability for the separation of highly volatile oils.

Three major steps are involved in separating and identifying components of a hydrocarbon oil sample using a chromatography instrument (315) performing GC. Namely, the steps are injection, separation, and detection. The process of performing gas chromatography on a given hydrocarbon oil sample by the sample characterization system (310) is described as follows, in accordance with one or more embodiments.

First, the given hydrocarbon oil sample is visually inspected for any signs of physical separation suggesting the presence of a phase other than oil (such as water or other liquid contaminants), which would deem the sample unsuitable for analysis. During this step, the viscosity of the given hydrocarbon oil sample is also inspected to ensure enough volatility (or a low enough viscosity) for the chromatography instrument (315) to handle the sample without clogging its valves or flowlines. In one or more embodiments, the viscosity of the sample is classified through visual inspection. In other embodiments, the viscosity of the sample is measured (e.g., using a viscometer) and compared to a viscosity threshold. If the given hydrocarbon oil sample is found to be heavy (i.e., exceeding the viscosity threshold or classified as heavy), it is diluted with carbon disulfide ($CS_2$) prior to injection. Once an initial quality assurance of the sample is completed, the sample is placed in a suitable vial and automatically injected into an inlet of the chromatography instrument (315) using automatic liquid sampler (e.g., Agilent Automatic Liquid Sampler).

In one or more embodiments, the inlet of the chromatography instrument (315) is attached to one end of a column that is housed in a temperature-controlled oven and coated with the liquid stationary phase. In some instances, the temperature-controlled oven may be considered part of the chromatography instrument (315). As the liquid oil sample passes through the column while being carried by a carrier gas (e.g., helium makeup gas), it is separated into its individual components. The other end of the column is attached to a flame ionization detector (FID).

The FID is highly sensitivity to hydrocarbons over a large range of hydrocarbons. Further, the FID is precise and generates reproducible measurements (i.e., low instrument uncertainty). The separated components enter the FID and the FID detects the presence of a hydrocarbon and generates an electrical signal proportional to the concentration of the detected hydrocarbon. In one or more embodiments, the signals are then sent to a data analysis program (316) that produces a chromatogram. In one or more embodiments, the data analysis program (316) is part of the chromatography instrument (315) and/or the sample characterization system (310). For example, the data analysis program (316) is depicted as part of the sample characterization system (310) in FIG. 3. Generally, a chromatogram is a graphical depiction of the components detected in a given hydrocarbon oil sample along with an indication of their relative quantity. An example chromatogram (400) is depicted in FIG. 4.

Figure 4:
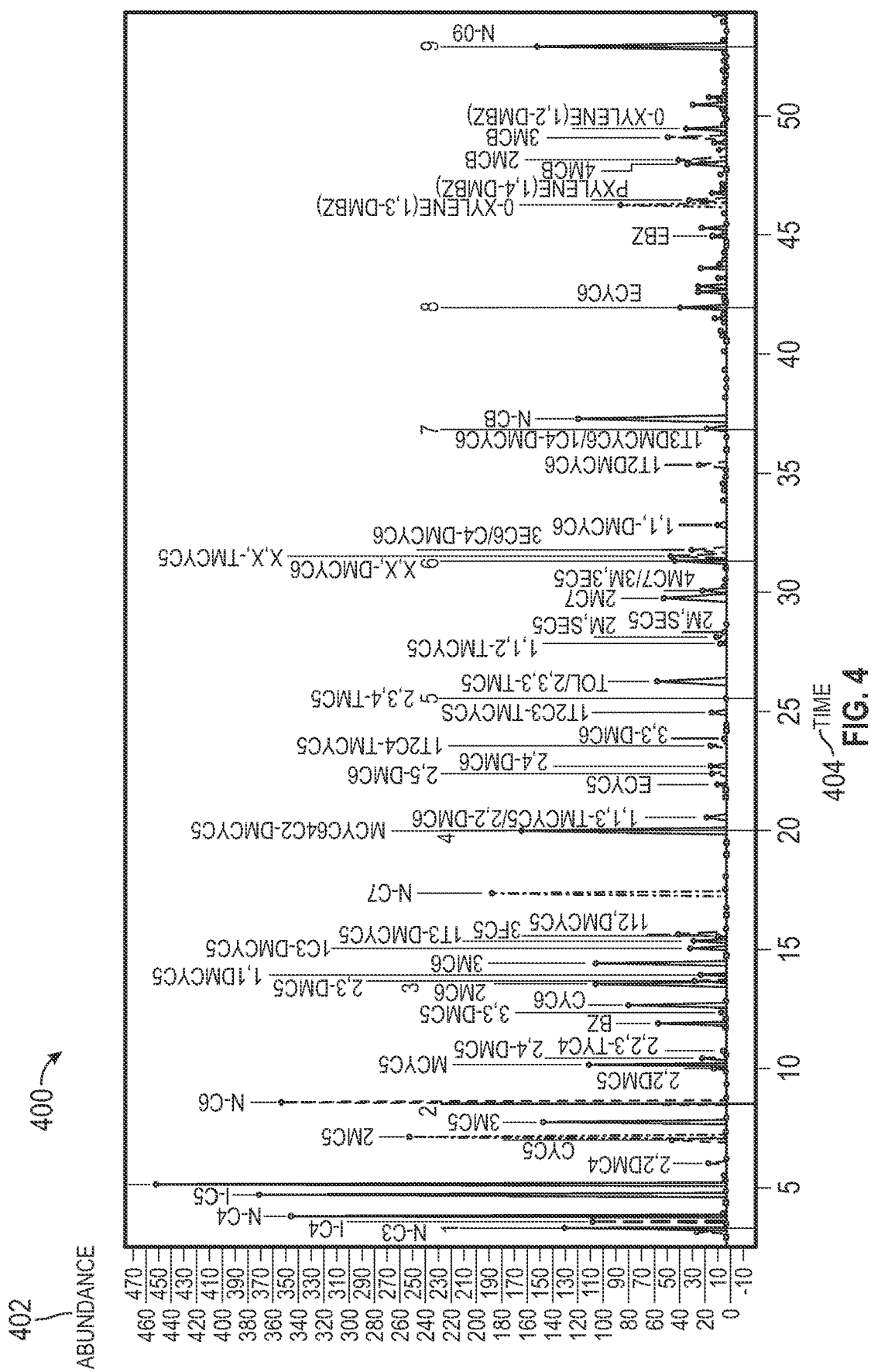
FIG. 4 depicts a chromatogram in accordance with one or more embodiments.

As depicted in FIG. 4, the FID detects the presence of a hydrocarbon and outputs a signal proportional to concentration or abundance (402) over a period of time (404). Because of the unique properties of each component, the components are separated temporally, or otherwise reach the FID at different times, resulting in peaks or spikes in the signal output by the FID. The data analysis program (316) can be used to label each peak or spike in the FID signal as a specific component. In one or more embodiments, peak integration of the compound peaks is completed by the data analysis program (316) by comparing the relative temporal location of peaks in the signal produced by the FID to a light hydrocarbon chromatogram of a known oil standard. In particular, peak integration produces a measure that correlates to the quantity of the compound present in the given hydrocarbon oil sample. In one or more embodiments, peak integration and labeling of a chromatogram is performed automatically by the data analysis program (316). In other embodiments, peaks are labelled, and/or the labels produced by the data analysis program (316) are validated, by a subject matter expert. That is, in one or more embodiments, peak integration and chromatogram labelling are performed manually.

In one or more embodiments, the data analysis program (316) has methods, along with adjustable and preset parameters, that specify a predefined methodology for the chromatography instrument (315). That is, a given method of the data analysis program (316) contains detailed specifications relating to the chromatography instrument (315) such as a defined temperature program and a list of the ordered compounds being detected at specified run times. The data analysis program (316) and associated method also contain information related to injection volumes, valve positions, split ratio, and column description. In accordance with one or more embodiments, the chromatography instrument (315) is operated according to a predefined light hydrocarbons method that is programmed to analyze hydrocarbon compounds with carbon numbers $C_4$ to $C_{10}$. The result of the chromatography instrument (315) (e.g., a chromatogram) is stored as geochemical data (314) for each sample processed by the sample characterization system (310).

In accordance with one or more embodiments, the geochemical data (314) acquired using the sample characterization system (310) is further processed or transformed into one or more derived features referenced herein collectively as derived data (318). Derived data (318) includes the output of one or more transformation functions applied to any subset of the geochemical data (314) for a given sample. For example, it may be beneficial to construct one or more ratios of integrated peaks, or combinations of integrated peaks, to account for inter sample differences with respect to peak intensity (i.e., absolute abundance level). In accordance with one or more embodiments, five correlation ratios (CRs) and eight transformation ratios (TRs) are defined and determined as derived data (318) for each sample processed by the sample characterization system (310) given the geochemical data (314) of the sample. The five correlation ratios (CRs), referenced herein as $CR_1$ to $CR_5$, correspond to ratios that are resistive to transformation and/or change. In accordance with one or more embodiments, the CRs are given as:

$$CR_1 = \frac{P_{2,2-DMC5}}{P_{2,2-DM5} + P_{2,4-DMC5} + P_{3,3-DMC5} + P_{2,3-DMC5} + P_{3EC5}} \quad (2)$$

$$CR_2 = \frac{P_{2,3-DMC5}}{P_{2,2-DM5} + P_{2,4-DMC5} + P_{3,3-DCM5} + P_{2,3-DMC5} + P_{3EC5}} \quad (3)$$

$$CR_3 = \frac{P_{2,4-DMC5}}{P_{2,2-DM5} + P_{2,4-DMC5} + P_{3,3-DMC5} + P_{2,3-DMC5} + P_{3EC5}} \quad (4)$$

$$CR_4 = \frac{P_{3,3-DMC5}}{P_{2,2-DM5} + P_{2,4-DMC5} + P_{3,3-DMC5} + P_{2,3-DMC5} + P_{3EC5}} \quad (5)$$

$$CR_5 = \frac{P_{3,5-DMC5}}{P_{2,2-DM5} + P_{2,4-DMC5} + P_{3,3-DMC5} + P_{2,3-DMC5} + P_{3EC5}} \quad (6)$$

where P corresponds to the integrated peak for the compound identified in the associated subscript.

The eight transformation ratios (TRs), referenced herein as $TR_1$ to $TR_8$, correspond to ratios related to transformation of the hydrocarbon, where a transformation change in the chemical composition of the hydrocarbon can be a result of water washing, biodegradation, and evaporation. In accordance with one or more embodiments, the TRs are given as:

$$TR_1 = \frac{P_{Tol/2,3,3,-TMC5}}{P_{1,1-DMCyC5}} \quad (7)$$

$$TR_2 = \frac{P_{n-C7}}{P_{1,1-DMCyC5}} \quad (8)$$

$$TR_3 = \frac{P_{3MC6}}{P_{1,1-DMCyC5}} \quad (9)$$

$$TR_4 = \frac{P_{2MC6}}{P_{1,1-DMCyC5}} \quad (10)$$

$$TR_5 = \frac{P_{2MC6} + P_{3MC6}}{P_{1,1-DMCyC5}} \quad (11)$$

$$TR_6 = \frac{P_{1t2-DMCyC5}}{P_{1,1-CMCyC5}} \quad (12)$$

$$TR_7 = \frac{P_{1t3-DMCyC5}}{P_{1,1-DMCyC5}} \quad (13)$$

$$TR_8 = \frac{P_{2MC6} + P_{3MC6}}{P_{2,2-DM5} + P_{2,4-DMC5} + P_{3,3-DMC5} + P_{2,3-DMC5} + P_{3EC5}} \quad (14)$$

Where, again, P corresponds to the integrated peak for the compound identified in the associated subscript.

It is emphasized that while five CRs and eight TRs are enumerated as derived features given the geochemical data (314) of a given hydrocarbon oil sample, the derived data (318) need not consist of all these ratios or be limited to only the identified ratios. For example, in one or more embodiments, the derived data (318) may consist of only the CRs without including the TRs. On with ordinary skill in the art will appreciate that additional derived features may be produced from the geochemical data (314) and stored as derived data (318) without departing from the scope of this disclosure.

Figure 5:
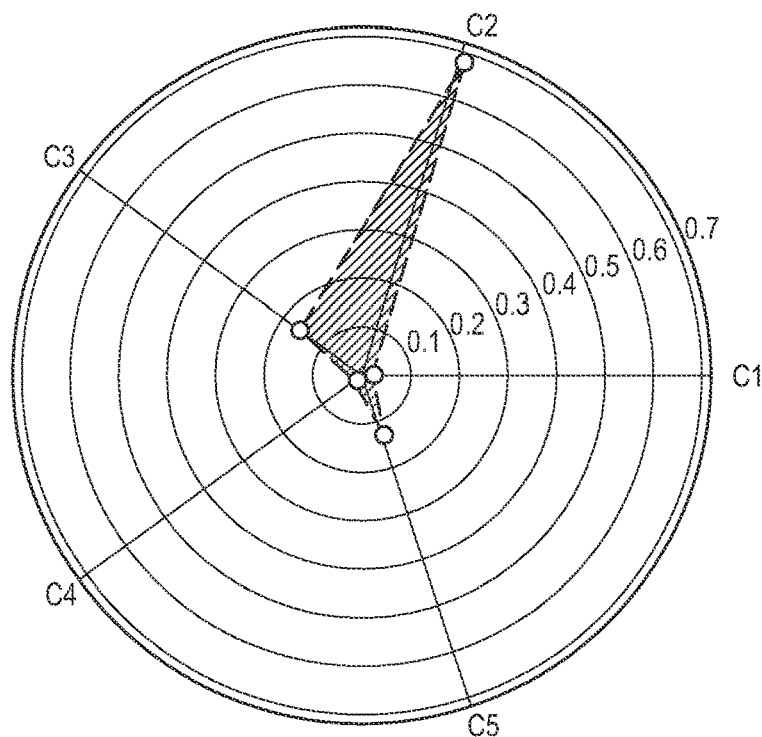
FIG. 5 depicts a star diagram of correlation ratios in accordance with one or more embodiments.
Figure 6:
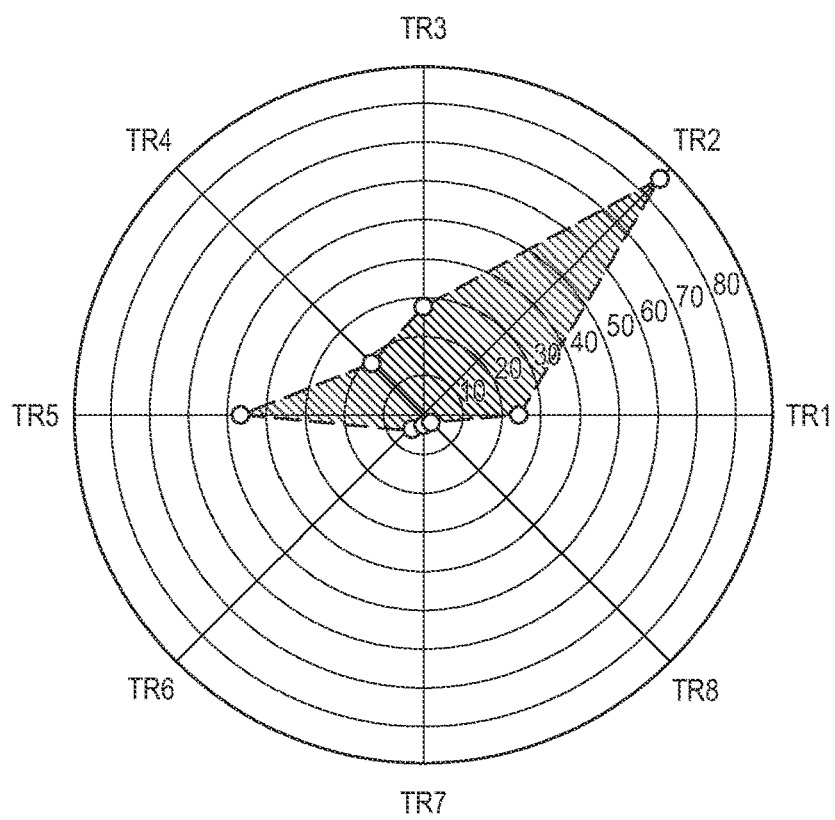
FIG. 6 depicts a star diagram of transformation ratios in accordance with one or more embodiments.

The derived features, once computed, may be plotted for visualization and comparison. For example, FIG. 5 depicts a so-called star diagram that graphically displays the values of the correlation ratios (CRs) for an example hydrocarbon oil sample. FIG. 6, likewise, depicts a star diagram that displays the transformation ratios (TRs) for the same example hydrocarbon oil sample used in FIG. 5. Visualization of derived data (318) is not limited to only star diagrams but may include line plots, bar plots, etc. In one or more embodiments, two or more hydrocarbon oil samples are qualitatively compared by overlaying their graphical representations (e.g., overlaying two or more star diagrams). While such a comparative analysis is informative, it is not quantitative and relies upon human judgment. As will be described later in the instant disclosure, the automated and quantitative reservoir complexity analysis system (300) is capable of quantitatively processing derived data (318) in order to, at least, identify groups of similar samples and thus identify features of the subsurface such as geological compartments and faults.

Figure 7:
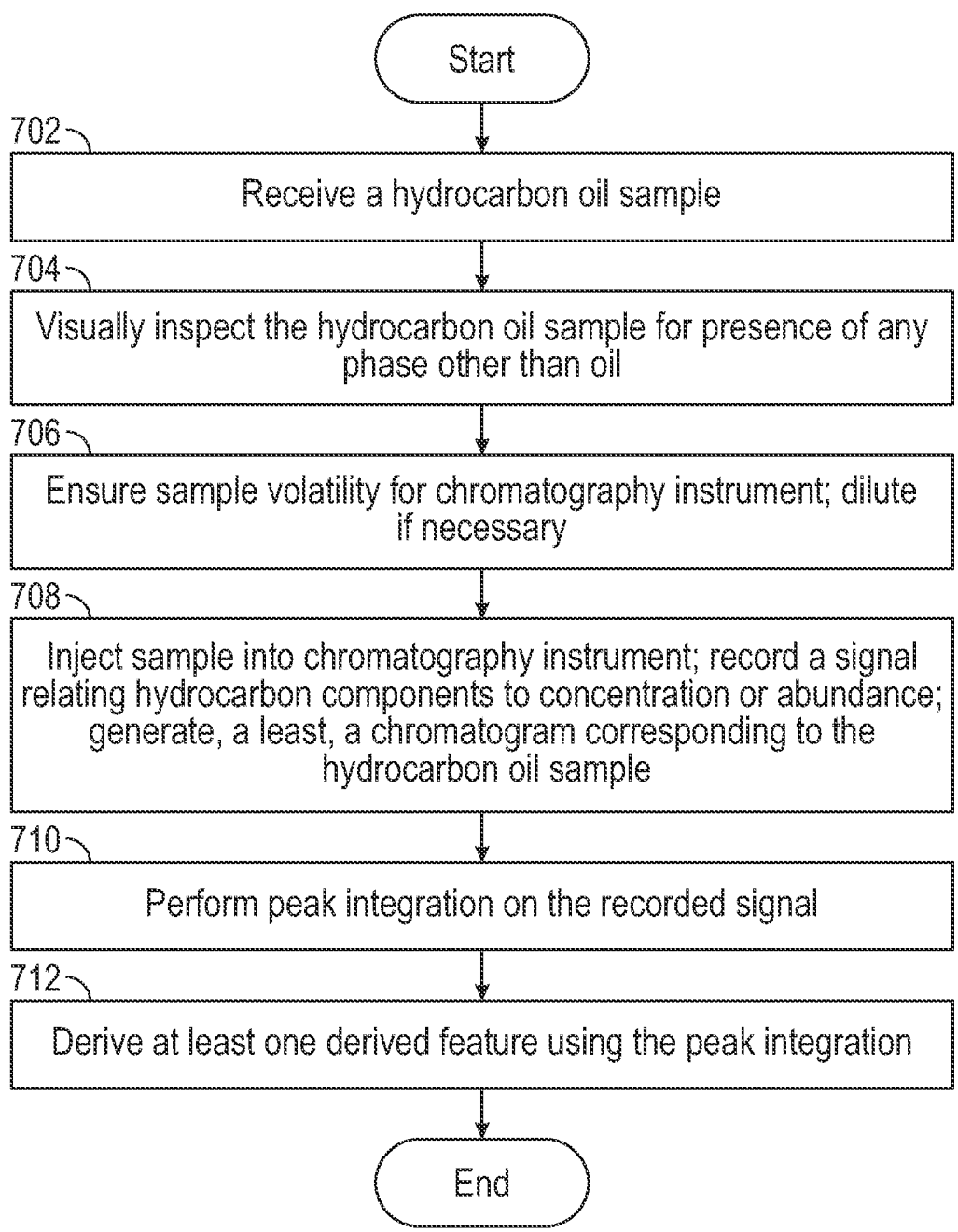
FIG. 7 depicts a flowchart in accordance with one or more embodiments.

In accordance with one or more embodiments, the use of the sample characterization system (310) is outlined in the flowchart of FIG. 7. In Block 702, a hydrocarbon oil sample is received. The hydrocarbon oil sample is associated with spatial and/or temporal data. That is, at least the surface coordinates at which the sample was acquired are known. In some embodiments, information regarding the depth and/or time at which the sample was acquired are/is also known. In Block 704, the hydrocarbon oil sample is visually inspected for the presence of any phase other than oil. If the hydrocarbon oil sample is determined, through the visual inspection, to contain contaminates, the sample is discarded and, in some instances, a new sample may be obtained. If the sample is free of contaminates, it is further evaluated to ensure that its volatility is suitable for use and processing in the chromatography instrument as depicted in Block 706. The volatility may be determined by qualitative or quantitative evaluation of the viscosity of the sample. For example, in one or more embodiments, the sample (or a portion of the sample) may be processed using a viscometer to determine the viscosity of the sample. Then, the determined viscosity may be compared to a predefined viscosity threshold. If the sample is determined to have sufficiently low viscosity, the sample may be processed by the chromatography instrument. If not, the sample may be diluted (e.g., using carbon disulfide) until it has sufficiently low viscosity. In Block 708, the sample is injected into the chromatography instrument. In one or more embodiments, injection is performed automatically using a designated liquid sampler. The chromatography instrument records a signal that relates detected hydrocarbon components to concentration or abundance. Further, as depicted in Block 708, a chromatogram is generated for the hydrocarbon sample. In Block 710, peak integration is performed on the recorded signal. Finally, in Block 712, at least one derived featured is computed using the peak integration information. The at least one derived features are stored as derived data.

It is emphasized that while the discussion surrounding sample characterization system (310) has used, as an example, gas chromatography of hydrogen oil samples, it is not limited to this procedure. As previously stated, the sample characterization system (310) may be applied to water samples using such techniques as X-ray fluorescence to characterize the water samples and generate geochemical data (314). Further, derived data (318) may be computed using functions or transformations applied to the geochemical data (314) other than the given correlation ratios (CRs) and transformation ratios (TRs).

Returning to FIG. 3, and as previously described, in one or more embodiments the automated and quantitative reservoir complexity analysis system (300) includes spatial-temporal data (301) for each sample processed by the sample characterization system (310). Thus, the automated and quantitative reservoir complexity analysis system (300) has access to geochemical data (314), derived data (318), and spatial-temporal data (301). In one or more embodiments, the automated and quantitative reservoir complexity analysis system (300) includes a graph constructor (302). The graph constructor (302) constructs a graph representation of two or more samples. In general, a graph may be described as structure that relates two or more items; in this case samples. A graphical depiction of an example graph (800) is provided in FIG. 8.

Figure 8:
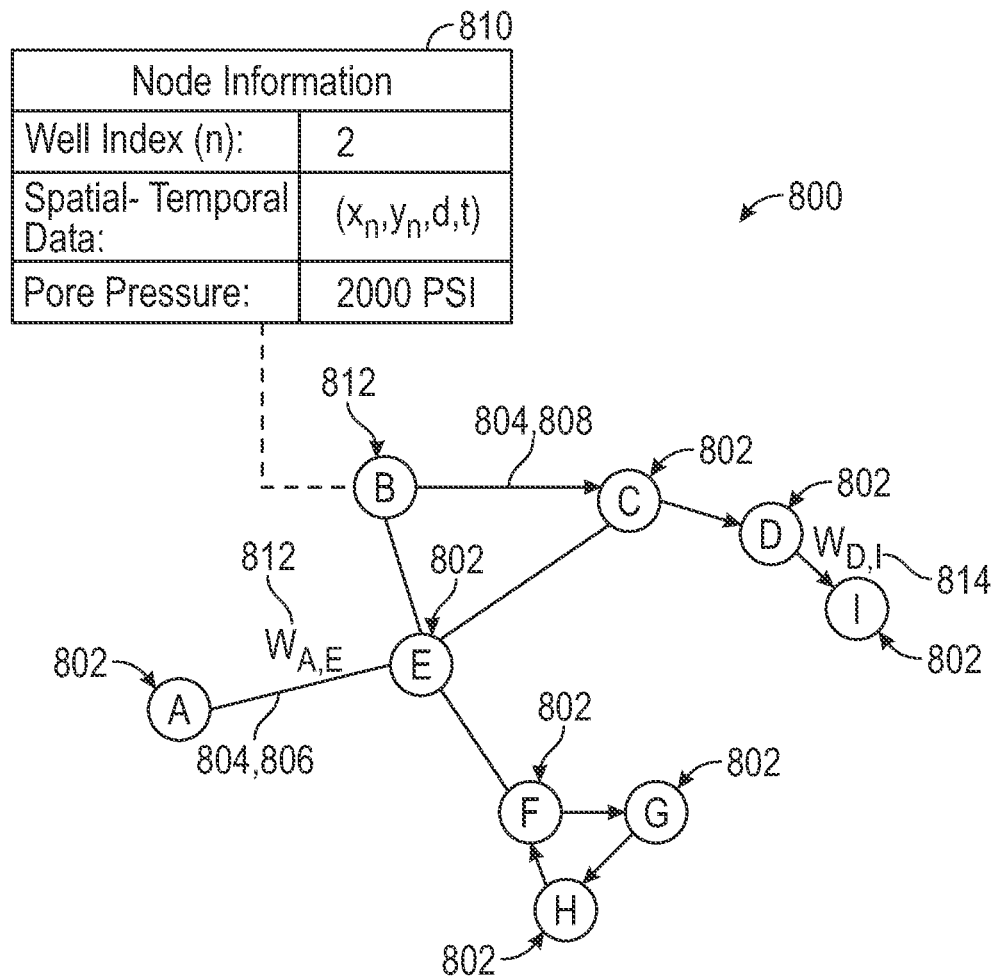
FIG. 8 depicts a graph in accordance with one or more embodiments.

In general, a graph is composed of two or more nodes (802) (or vertices), where each node (or vertex) represents an item (e.g., a sample). In FIG. 8, each node (802) is given an alphabetic identifier (i.e., "A," "B," "C," etc.). A node (802) may include node information (810) describing the item it represents. For example, if a node represents a hydrocarbon oil sample, the node may include information such as the index of the well from which the sample was obtained, spatial-temporal data associated with the sample, and the pore pressure at the location where the sample was obtained. Additionally, a node (802) that represents a sample may include the geochemical data and derived data associated with the sample. FIG. 8 depicts example node information (810) associated with Node B, where Node B represents a hydrocarbon oil sample.

In a graph, relations between the nodes (802) are represented as edges (804). Edges (804) may also be referred to as lines or links. Note that to avoid unnecessarily cluttering FIG. 8, not every edge (804) is annotated with a numeric identifier. Edges (804) may further be classified as either an undirected edge (806) or a directed edge (808). When a graph is graphically depicted, directed edges (808) are typically drawn with a line terminating with an arrowhead. In contrast, undirected edges (806), when depicted graphically, do not use arrowheads. Again, to avoid cluttering FIG. 8, not every undirected edge (806) and directed edge (808) are annotated with a numeric identifier.

In general, a directed edge (808) indicates a constraint or asymmetry between the nodes (802) that it connects. For example, if each node in a graph represents an intersection of streets, then each edge may be said to represent the street, or roadway, that physically connects the two intersections. If a connecting street is a "one-way" street (i.e., a street that only allows for traffic to proceed in a single direction), then a directed edge (808) may be used to indicate that traffic can only flow in one direction, whereas an undirected edge (806) would indicate that the street it represents allows for bidirectional traffic. The example graph (800) of FIG. 8 depicts both undirected edges (806) and directed edges (808). A graph may be composed of only undirected edges (806), in which case it may be categorized as an undirected graph. Likewise, a graph may be composed of only directed edges (808) and, as such, categorized as a directed graph. Further, a directed graph may exhibit acyclic and/or cyclic behavior or connections between its nodes (802). For example, in the example graph (800), the connection between Node C proceeding to Node D and further continuing to Node I is acyclic as there is no way to return to a previous node (either Node C or Node D) upon traversing those edges (804). In contrast, Node F, Node G, and Node H demonstrate cyclic behavior because, while although their connecting edges (804) are directed edges (808), traversal of their connecting edges (804) does not prohibit access to any of those nodes (802). A directed graph with any cyclic connections may be termed a cyclic graph and a directed graph completely absent of cyclic connections is often referred to as an acyclic graph (i.e., a directed acyclic graph (DAG)).

Edges (804) of a graph, whether undirected edges (806) or directed edges (808), may be associated with an edge weight. An edge weight is typically a numeric value (i.e., a scalar), however, in some instances, an edge (804) may be associated with two or more weights in which case the edge weight may be better represented or described as a vector or tensor of any given rank. FIG. 8 depicts a first edge weight (812), $w_{A,E}$, associated with the edge (804) connecting Node A and Node E. Again, to avoid cluttering FIG. 8, the edge weight for every edge (804) is not depicted. However, it will be well understood by one of ordinary skill in the art that any edge (804) in a graph may be associated with an edge weight. For example, FIG. 8 depicts a second edge weight (814), $w_{D,I}$, associated with the directed edge (808) connecting Node D and Node I.

In general, graphs may be represented and computationally stored in a variety of different data structures. For example, graphs may be represented using an adjacency matrix, adjacency list, or adjacency set; to name a few data structures. An example adjacency list for the graph depicted in FIG. 8 is provided herein as Table I. As seen, in an adjacency list, each node is associated with a "node list" that lists that identifies the nodes connected to the given node. For undirected edges (806), connected nodes will each occur in the node list of the non-referenced node. Node information (810) and edge weights may further be stored in a data structure representative of a graph without limitation. One with ordinary skill in the art will appreciate that the instant disclosure places no limitation on how a constructed graph may be represented and/or computationally stored.

TABLE I

Adjacency matrix for the graph of FIG. 8. Note that node information and edge weights are not shown as part of the adjacency matrix but may be included.

| Node | Edges |
|---|---|
| A | [E] |
| B | [C, E] |
| C | [D, E] |
| D | [ ] |
| E | [A, B, C, F] |
| F | [E, G] |
| G | [H] |
| H | [F] |

Figure 9:
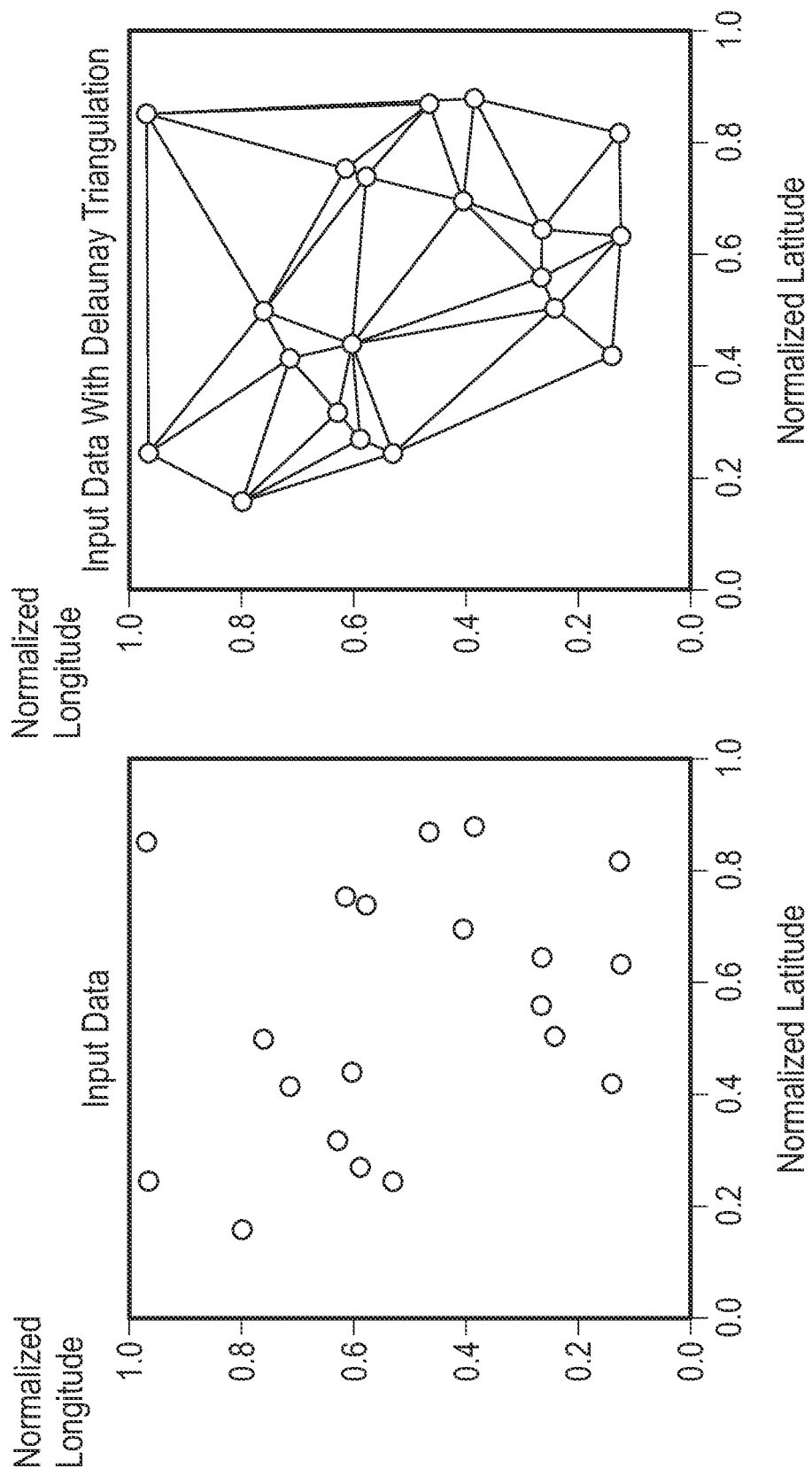
FIG. 9 depicts Delaunay triangulation applied to a set of spatially disposed points or nodes in accordance with one or more embodiments.

As stated, the graph constructor (302) constructs a graph representation of two or more samples. In accordance with one or more embodiments, the graph constructor (302) represents each acquired sample (e.g., hydrocarbon oil sample) as a node and determines the edges (i.e., determines which nodes are connected) using the spatial data (i.e., well location and, in some instances, depth) of each sample. Because each collected sample is represented as a node, the graph constructor (302) identifies which nodes should be connected with an edge. In accordance with one or more embodiments, the graph constructor (302) determines edges between nodes using Delaunay triangulation. FIG. 9 depicts an example of Delaunay triangulation being applied to a set of nodes each representing a well sample, in accordance with one or more embodiments. In the example of FIG. 9, each sample is acquired at the same depth and at the same time such that the samples may be plotted as nodes along a two-dimensional plane indicative of the physical location of the well from which each sample was acquired. That is, nodes are given an initial location, or relative disposition, according to their spatial-temporal data (301), which in the case of FIG. 9, consists of an x and y coordinate pair (i.e., $(x_n, y_n)$). In one or more embodiments, nodes may be initially disposed within a three-dimensional volume according to the well location and depth of the sample. In other embodiments, the graph constructor (302) is applied independently to two or more sets of samples to construct a graph representation of each set, where each set of the two or more sets has a different temporal value. In other embodiments still, nodes may be initially disposed within a three- or four-dimensional space that includes a temporal axis, however, in such a case the temporal axis will likely be scaled so as to not have an outsized (or undersized) effect on the graph construction. Returning to the example of FIG. 9, the left pane of the FIG. 9 locates each sample according to a normalized longitude and a normalized latitude coordinate (i.e., an x and y spatial coordinate for the well from which each sample (node) was acquired). Once the nodes have been given a relative disposition according to their associated spatial-temporal data (301), Delaunay triangulation can be used to determine which nodes should be connected with an edge. With edges determined, it may be said that the graph constructor (302) as constructed a, at least initial, graph representation of the samples. Again, the graph may be stored computationally using any known, or to be known, data structure. Further, information regarding node values and edge weights may be added to the graph at later stages, for example, using the node value determination system (304) and edge value determination system (306) of the automated and quantitative reservoir complexity analysis system (300).

Delaunay triangulation connects nodes by attempting to maximize the minimum angle of constructed triangles. The right pane of FIG. 9 depicts the results (connections or edges made) of Delaunay triangulation applied to the nodes (representative of well samples and orientated according to well location) of the left pane of FIG. 9. In one or more embodiments, the graph constructor (302) further applies a pruning step after application of Delaunay triangulation, where the pruning step may remove some edges. In one or more embodiments, a first distance (do) between each pair of wells connected by an edge is computed. In one or more embodiments, the first distance (do) is computed using the Haversine formula based on the latitude and longitude of each well. In one or more embodiments, edges initially determined using Delaunay triangulation are removed if the first distance between the nodes (i.e., samples) connected by an edge exceeds a first distance threshold. In one or more embodiments, the first distance threshold is 10 kilometers.

In one or more embodiments, the automated and quantitative reservoir complexity analysis system (300) includes a node value determination system (304). The node value determination system (304) determines the node information (810), if any, associated with each node of the constructed graph. In one or more embodiments, the node information (810) includes the pore pressure associated with the location at which the sample, represented as a node, was obtained.

In accordance with one or more embodiments, the automated and quantitative reservoir complexity analysis system (300) further includes an edge value determination system (306). The edge value determination system (306) determines the weight, that may include one or more scalar values (i.e., a vector or tensor), for each edge in the constructed graph. In accordance with one or more embodiments, the edge value determination system (306) computes a first dissimilarity metric for every pair of nodes connected by an edge and uses the first dissimilarity metric as the edge weight. In one or more embodiments, the first dissimilarity between two connected nodes is computed according to $$d_1(m^{(i)}, m^{(j)}) = \sqrt{\sum_{k=1}^{L_{CR}} (CR_k^{(j)} - CR_k^{(i)})^2}, \quad (15)$$

where m represents a node and $m^{(i)}$ represents the $i^{th}$ node and $m^{(j)}$ the $j^{th}$ node. CR represents a vector of correlation ratios (or vector of any derived data (318)) for a sample or node given by the associated superscript (either i or j). Each element in the vector is indexed using k and the length of the vector is given by $L_{CR}$. Inspection of EQ. 15 reveals that the first dissimilarity metric is equivalent to the Euclidean distance between two nodes (samples) where the position of each node is given according to its vector of correlation ratios. In one or more embodiments, the vector of correlation ratios is not limited to only correlation ratios but may include any derived data (318) item.

In some embodiments, a second dissimilarity ratio is computed in a similar fashion as given in EQ. 15 but using vectors of transformation ratios (i.e., TR instead of CR). That is, the second dissimilarity ratio is computed as $$d_2(m^{(i)}, m^{(j)}) = \sqrt{\sum_{k=1}^{L_{TR}} (TR_k^{(j)} - TR_k^{(i)})^2}. \quad (16)$$

The weight assigned to the edge connecting two nodes (samples) may be a vector that includes one or more of the first distance ($d_0$), first dissimilarity metric ($d_1$), and second dissimilarity metric ($d_2$). For example, in one or more embodiments, the weight assigned to the edge connecting the $i^{th}$ and $j^{th}$ nodes, $w_{i,j}$, is a vector composed of $d_1(m^{(i)}, m^{(j)})$ and $d_2(m^{(i)}, m^{(j)})$, or $[d_1, d_2]^{(i,j)}$. In some embodiments, the weight assigned to the edge connecting the $i^{th}$ and $j^{th}$ nodes, $w_{i,j}$, is simply the first dissimilarity metric ($d_1$). In one or more embodiments, the weight assigned to the edge connecting any two nodes is, itself, a weighted sum of the first distance ($d_0$), first dissimilarity metric ($d_1$), and second dissimilarity metric ($d_2$). That is, in one or more embodiments, the weight associated with an edge connecting the $i^{th}$ and $j^{th}$ nodes is $$w_{i,j} = \alpha_0 d_0 + \alpha_1 d_1 + \alpha_2 d_2, \quad (17)$$

where $\alpha_0$, $\alpha_1$, and $\alpha_2$ are predefined hyperparameters.

In one or more embodiments, the edge weights of the constructed graph are normalized. For example, in the case where the edge weights of the constructed graph are simply the first dissimilarity metric, then the edge weights may be normalized according to $$d_{1,norm}(m^{(i)}, m^{(j)}) = \frac{d_1(m^{(i)}, m^{(j)}) - \min(d_1)}{\max(d_1) - \min(d_1)}, \qquad (18)$$

where the min and max operators are applied over all of the first dissimilarity metrics.

Thus, in accordance with one or more embodiments, the automated and quantitative reservoir complexity analysis system (300) constructs a graph representation of two or more samples acquired from the subterranean region of interest. In the graph, each node represents a sample and may contain node information (810) related to the sample. Further, edges between nodes are determined by the graph constructor (302) using Delaunay triangulation based on the spatial-temporal data (301) of the samples and edges are assigned weights based on the geochemical data (314) and/or derived data (318) of the samples.

In accordance with one or more embodiments, the automated and quantitative reservoir complexity analysis system (300) can detect outliers in the samples (i.e., outlier detection (307)) based on the edge weights (e.g., first dissimilarity metric). In one or more embodiments, the average dissimilarity, $\bar{d}$, may be computed for each node. Thus, $\bar{d}^{(i)}$ represents the average dissimilarity of the $i^{th}$ node (sample). When a single dissimilarity metric, d, is determined between pairs of connected nodes, then the average dissimilarity of the $i^{th}$ node (sample) may be given as $$\bar{d}^{(i)} = \frac{1}{|\{CN\}^{(i)}|} \sum_{j \in \{CN\}^{(i)}} d(m^{(i)}, m^{(j)}), \qquad (19)$$

where $\{CN\}^{(i)}$ represents the set of nodes connected (i.e., connected nodes (CN)), connected by an edge, to the $i^{th}$ node and $|\{CN\}^{(i)}|$ represents the number of nodes in that set. In other embodiments, the average dissimilarity for each node is computed by considering the dissimilarity of the node to all other nodes; not just those to which it is connected by an edge. That is, in some embodiments, the average dissimilarity of the $i^{th}$ node (sample) is computed as $$\bar{d}^{(i)} = \frac{1}{T-1} \sum_{j \in \{i\}^C} d(m^{(i)}, m^{(j)}), \qquad (20)$$

where T is the total number of nodes (samples) and $\{i\}^C$ represents the set of all nodes (samples) excluding the $i^{th}$ node (sample) (i.e., the complement of a set containing only the $i^{th}$ node (sample)). A benefit to using EQ. 20 to compute the average dissimilarity for each node is that it may be done without first constructing a graph representation of the samples. That is, it is not required to determine which nodes (samples) are connected using the graph constructor (302) before applying EQ. 20 and subsequently performing outlier detection (307).

Note that the average dissimilarity, regardless if after the form of EQ. 19 or EQ. 20, can readily be generalized to the case where more than one dissimilarity metric (or scalar edge weight) is used. In one or more embodiments, the average dissimilarity is a vector where each element of the vector is an average dissimilarity determined according to either EQ. 19 or EQ. 20 using a different dissimilarity metric (e.g., $d_1$ and $d_1$). In other embodiments, the average dissimilarity is the weights sum of average dissimilarities each computed using a different dissimilarity metric.

Once an average dissimilarity is determined for each node (or sample in the case when a graph has not yet be constructed), in one or more embodiments, outliers are detected by identifying the nodes (or samples), if any, with an average dissimilarity outside a predefined range based on the inter-quartile range (IQR) of the average dissimilarities when considering every node (sample). In one or more embodiments, the predefined range is given as $$[Q_1 - \beta * IQR, Q_3 + \beta * IQR], \qquad (21)$$

where $Q_1$ and $Q_3$ represent the first and third quartiles of the average dissimilarities, IQR is the inner-quartile range of the average dissimilarities (i.e., IQR=$Q_3$–$Q_1$), and 3 is a predefined scaling factor. In one or more embodiments, the predefined scaling factor, $\beta$, is 1.5. Other methods of outlier detection (307) may be employed by the automated and quantitative reservoir complexity analysis system (300) without limitation. In one or more embodiments, nodes (samples) identified as outliers are removed from the set of samples and no longer considered by the automated and quantitative reservoir complexity analysis system (300). In one or more embodiments, a graph of the nodes (samples) may be reconstructed, using the graph constructor (302), without the outlying nodes (samples).

Once the automated and quantitative reservoir complexity analysis system (300) has constructed a graph representing two or more samples with determined node and edge values, the automated and quantitative reservoir complexity analysis system (300) applies one or more graph-based algorithms (308) to the constructed graph. In accordance with one or more embodiments, a graph-based clustering algorithm is applied to the constructed graph to determine and assign nodes (samples) to one or more groups. The clustering of similar samples is performed automatically. In general, any graph-based clustering algorithm may be used so long as the selected algorithm is configured (or configurable) to operate with the edge weights (e.g., scalar, vector, or tensor). Examples of graph-based clustering algorithms that can be used are: Louvain Community Detection Algorithm (Blondel et al., 2008); Kernighan-Lin algorithm (Kernighan and Lin, 1970); Luke's tree-based partitioning (Lukes, 1974); and Clauset-Newman-Moore greedy modularity maximization (Clauset et al., 2004). Note that the Kernighan-Lin algorithm can only handle partitioning to two subgraphs (two clusters) but multiple iterations can be made to subdivide the results.

The graph-based algorithms (308) employed by the automated and quantitative reservoir complexity analysis system (300) are not limited to graph-based clustering algorithms. For example, the constructed graph may be processed by a graph neural network to predict missing node information (810) such as pore pressure data in wells where that information is missing. This is because pore pressure data (328) is affected by compartmentalization and so a correlation is expected. Non-neural network algorithms can also be used. For example, if the dataset is very dense, i.e., with lots of samples in a small spatial area, graph simplification algorithms can be used.

In one or more embodiments, one or more graph-based algorithms (308) are used with the edge weights and location information to predict the hydrocarbon migration (movement) direction automatically, i.e., construct a directed graph. As hydrocarbons migrate, the correlation between the hydrocarbons decreases. As such, a directed graph can indicate a direction (at least semi-quantitatively) of migration, where the directed graph is constructed from the undirected graph output by the graph constructor (302) based on the edge weights determined by the edge value determination system (306).

In one or more embodiments, the automated and quantitative reservoir complexity analysis system (300) further includes one or more correlation methods (309) that may be applied to determine the correlation between samples and/or between groups of samples where sample groupings are determined using a graph-based algorithm (308). For example, consider a correlation ratio vector for the $i^{th}$ node, $CR^{(i)}$, composed of the five correlation ratios given by EQs. 2-6 (i.e., $CR^{(i)}=[CR_1, CR_2, CR_3, CR_4, CRs]^{(i)}$). Then, in one or more embodiments, a correlation metric is determined for each pair of samples according to $$r^{(i,j)} = \frac{\sum_{k=1}^{L_{CR}}(CR_k^{(i)} - \overline{CR}^{(i)})(CR_k^{(j)} - \overline{CR}^{(j)})}{\sqrt{\sum_{k=1}^{L_{CR}}(CR_k^{(i)} - \overline{CR}^{(i)})^2 \sum_{k=1}^{L_{CR}}(CR_k^{(j)} - \overline{CR}^{(j)})^2}}, \quad (22)$$

where $\overline{CR}^{(i)}$ represents the average of the correlation ratio vector for the $i^{th}$ node. Another correlation metric may be computed by comparing transformation ratio vectors between nodes (samples).

In one or more embodiments, a graph-based algorithm (308) is applied to a constructed graph to cluster or group the nodes into one or more groups. Herein, the resultant number of groups is given as G and an individual group is indexed using g. Thus, $1 \leq g \leq G$. A given group may include one or more samples. The set of samples in the $g^{th}$ group is referenced herein as $S^g$. Further, the number of samples in the $g^{th}$ group is given as $|S^g|$ and an individual sample in the set $S^g$ is indexed as s where the reference to the group index may be removed without undue ambiguity. In one more embodiments, a group correlation ratio vector is composed as a vector of the average correlation ratios, where the average is taken over the nodes (or samples) of the given group. That is, the group correlation ratio vector for the $g^{th}$ group is $CR^g=[\overline{CR}_1^g, \overline{CR}_2^g, \overline{CR}_3^g, \overline{CR}_4^g, \overline{CR}_5^g]$ where $\overline{CR}_k^g$ is given as $$\overline{CR}_k^g = \frac{1}{|S^g|}\sum_{s=1}^{|S^g|} CR_k^{(s)}. \quad (23)$$

In one or more embodiments, a correlation metric is determined for each pair of groups, where a pair of groups are indexed using u and v according to $$r^{(u,v)} = \frac{\sum_{k=1}^{L_{CR}}(\overline{CR}_k^{(u)} - \overline{\overline{CR}}^{(u)})(\overline{CR}_k^{(v)} - \overline{\overline{CR}}^{(v)})}{\sqrt{\sum_{k=1}^{L_{CR}}(\overline{CR}_k^{(u)} - \overline{\overline{CR}}^{(u)})^2 \sum_{k=1}^{L_{CR}}(\overline{CR}_k^{(v)} - \overline{\overline{CR}}^{(v)})^2}}, \quad (24)$$

where $\overline{\overline{CR}}^{(u)}$ represents the average of the group correlation ratio vector for the $u^{th}$ group. Mathematically, $\overline{\overline{CR}}^{(u)}$ is given as $$\overline{\overline{CR}}^{(u)} = \frac{1}{L_{CR}}\sum_{k=1}^{L_{CR}} \overline{CR}_k^{(u)}. \quad (25)$$

In one or more embodiments, correlation metrics are determined using transformation ratio vectors (for each node or sample) and group transformation ratio vectors (for each group). The equations used to compute correlation metrics are similar to EQs. 22 and 24—simply replacing any reference to a correlation ratio with a transformation ratio—and are not explicitly enumerated herein for concision.

Thus, in one or more embodiments, outputs of the automated and quantitative reservoir complexity analysis system (300) include a graph representation of the collected samples with the presence of edges determined according to a spatial-temporal relationship between samples and edge weights (or edge values) determined according to a comparison of geochemical data and/or derived data between connected samples. Further, outputs of the automated and quantitative reservoir complexity analysis system (300) include a cluster analysis (or grouping) of samples using one or more graph-based algorithms (308) and a determination of correlation metrics between samples or groups of samples. In one or more embodiments, the outputs of the automated and quantitative reservoir complexity analysis system (300) are directly used to inform models and decisions related to the development and use of an oil and gas field. Identified clusters (or groups) of samples may indicate subsurface compartmentalization. In one or more embodiments, clusters of samples are analyzed in view of external data, such as an isopach map, to determine the presence and location of one or more subsurface compartments. Additionally, pore pressure data (328), organized according to a graph and stored as node information, may be analyzed using one or more graph-based algorithms (308) to identify subsurface compartments.

Recognition of compartmentalization may necessitate changes in a drilling plan for the oil and gas field and may be used to determine an exact location of a new well. For example, if an oil and gas field is determined, through use of the automated and quantitative reservoir complexity analysis system (300), to have two disconnected compartments rather than one, engineers will ensure that wells are drilled to penetrate both compartments to produce the available hydrocarbons. Similarly, when water samples are characterized, the results of the automated and quantitative reservoir complexity analysis system (300) may be used to understand how formation and injection water are mixing during injection. Further, the automated and quantitative reservoir complexity analysis system (300) can be applied to samples collected at different times to see how hydrocarbons and/or water migrate with time. For example, application of the automated and quantitative reservoir complexity analysis system (300) at different times can lead to a change in an injection plan in order to maximize injection efficiency.

In summary, groups of samples determined according to the automated and quantitative reservoir complexity analysis system (300) as disclosed herein can be used to identify subsurface compartments (e.g., distinct hydrocarbon sources) and determine subsurface fluid migration. Knowledge of reservoir complexity, including compartmentalization, may be used with one or more simulation techniques (e.g., reservoir simulator) to accurately predict quantities of interest (e.g., production forecasting, wellbore planning, etc.). Further, in one or more embodiments, the automated and quantitative reservoir complexity analysis system (300) transmits a command signal (e.g., command Y (380)) to guide and/or control aspects of the drilling operations system (199), wellbore planning system (150), reservoir simulator (340) and/or inform the subsurface model (330).

Figure 10:
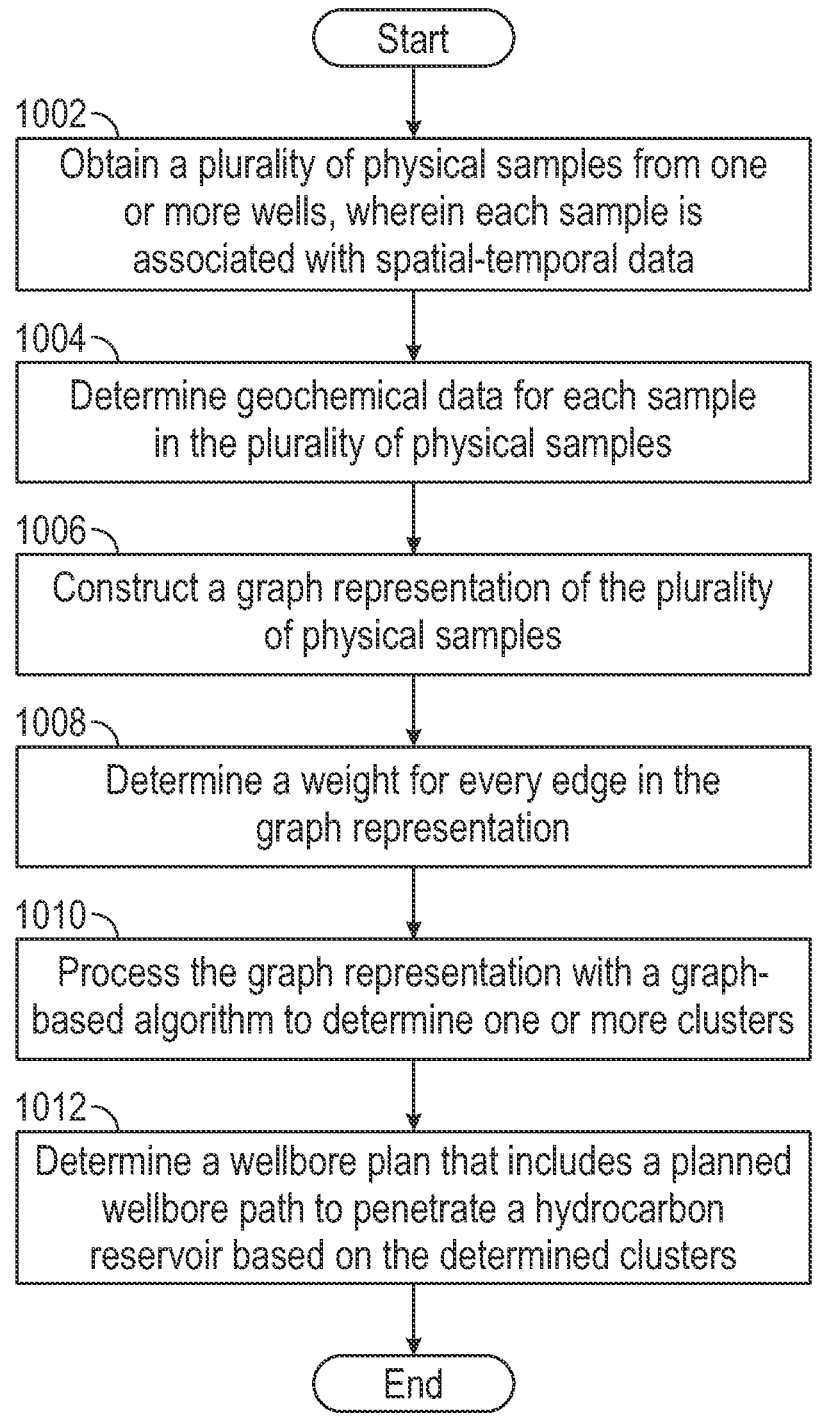
FIG. 10 depicts a flowchart in accordance with one or more embodiments.

FIG. 10 depicts a flowchart outlining the processes and/or use of the automated and quantitative reservoir complexity analysis system (300) in accordance with one or more embodiments. In Block 1002, a plurality of physical samples is obtained from one or more wells. Each physical sample ("sample") is associated with spatial-temporal data. In one or more embodiments, each sample is a hydrocarbon oil sample. In Block 1004, geochemical data for each sample is determined. Geochemical data may consist of one or more quantitative or qualitative features that describes and/or characterizes the sample. In one or more embodiments, the geochemical data consists of light hydrocarbon measurements obtained using a chromatography instrument. In one or more embodiments, one or more transformations is applied the geochemical data to form derived data. In one or more embodiments, the derived data consists of correlation ratios determined using EQs. 2 through 6 with the light hydrocarbon measurements. In Block 1006, a graph representation of the plurality of physical samples is constructed. In the graph representation each sample is represented as a node and the presence of an edge between any two nodes is based on the spatial-temporal data of the plurality of physical samples. In one or more embodiments, each sample is disposed in a volume with one or more spatial and/or temporal axis according to the spatial-temporal data of the samples. Then, Delaunay triangulation is performed to determine which samples (nodes) are connected with an edge. In Block 1008, a weight is determined for each edge in the graph representation. In one or more embodiments, the weight is set to the first dissimilarity metric determined using the correlation ratios of the two nodes connected by the edge according to EQ. 15. In Block 1010 the graph representation is processed with a graph-based algorithm to determine one or more clusters, where each of the one or more clusters includes at least one sample from the plurality of physical samples. In Block 1010, a wellbore plan for a new well is determined, for example, using the wellbore planning system (150) based on the determined clusters. In one or more embodiments the wellbore plan includes a planned wellbore path. In one or more embodiments, a wellbore is drilled using the drilling operations system (199) guided by the planned wellbore path. Thus, the automated and quantitative reservoir complexity analysis system (300) determines, at least in part, patterns, similarities, and groups among samples associated with a subsurface and/or at least one hydrocarbon reservoir. The groups of samples may, in turn, be used to identify subsurface compartments (e.g., distinct hydrocarbon sources) and determine subsurface fluid migration. Knowledge of reservoir complexity, including compartmentalization, may be used with one or more simulation techniques (e.g., reservoir simulator) to accurately predict quantities of interest (e.g., production forecasting, wellbore planning, etc.). Further, decisions regarding how best to produce oil and gas from one or more reservoirs, including planning the location of wells and altering process parameters over time to maximize production, may be informed by the results, and interpretation thereof, of the automated and quantitative reservoir complexity analysis system (300). For example, one or more subsurface models informed or altered by the determined clusters may be used by a reservoir simulator or other estimation method to forecast the production of a well and reservoir performance. Additionally, an understanding of the compartmentalization of the subsurface gained using the automated and quantitative reservoir complexity analysis system (300) may be used to develop injection strategies to optimize production and maximize injection efficiency.

FIGS. 11-15 provide example results from the application of the automated and quantitative reservoir complexity analysis system (300), as described herein, to a set of 41 hydrocarbon samples acquired from wells of an oil and gas field in the Middle East. The spatial-temporal data for the hydrocarbon samples indicates the location of the well from which a given sample was acquired, but does not include depth or time. Because the spatial-temporal data of the 41 hydrocarbon samples is two-dimensional, some of the results of the automated and quantitative reservoir complexity analysis system (300), such as the constructed graph and sample clustering, can be depicted as two-dimensional plot (e.g., FIGS. 13A-13B). One with ordinary skill in the art will appreciate that the inclusion of an example application of the automated and quantitative reservoir complexity analysis system (300) in the instant disclosure is provided only to aid in understanding does not, in any way, impose a limitation on the instant disclosure.

Figure 11:
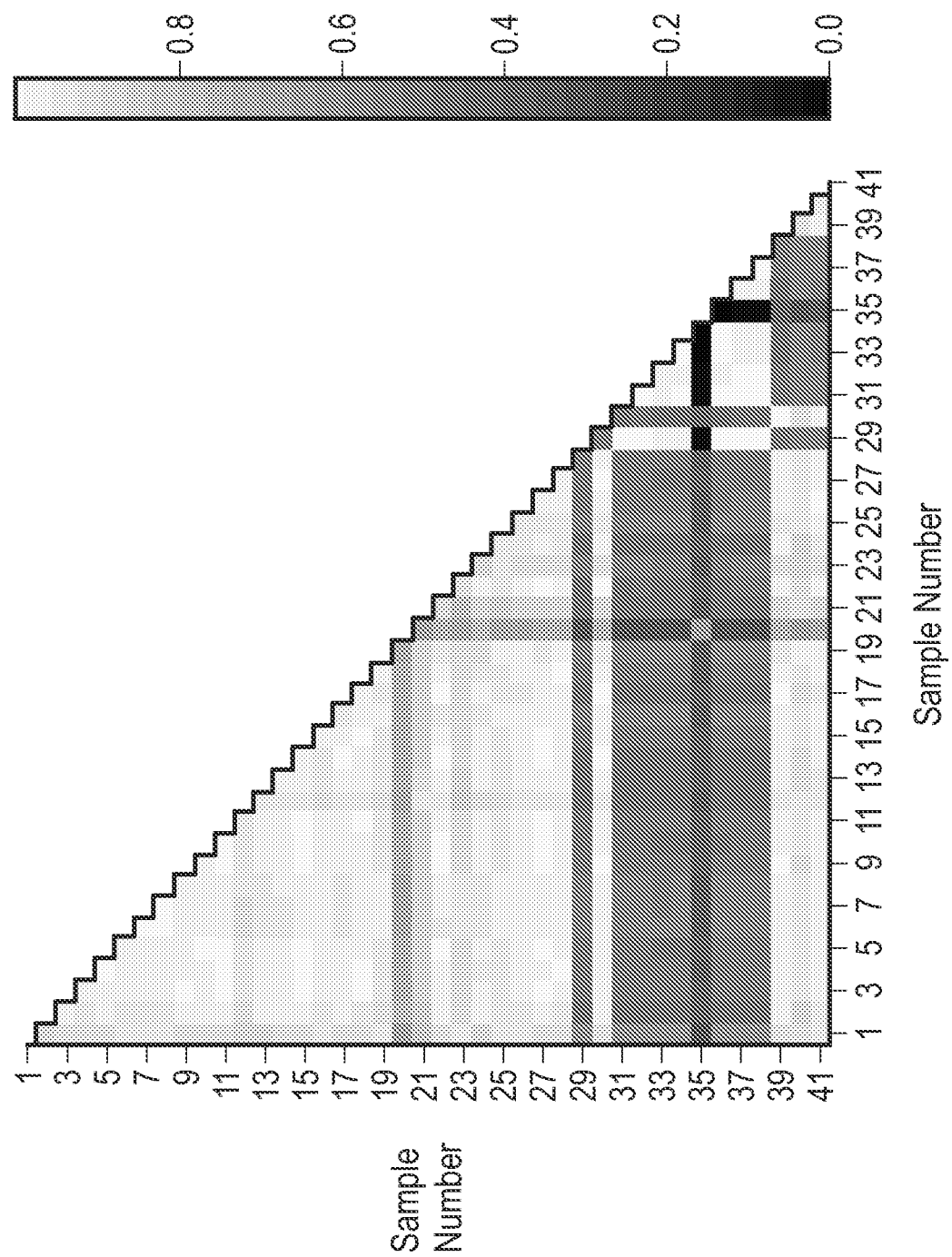
FIG. 11 depicts a correlation matrix in accordance with one or more embodiments.

Each of the 41 hydrocarbon samples was processed by the sample characterization system (310). In particular, gas chromatography (GC) was performed on the hydrocarbon samples and the chromatography output was processed to obtain correlation ratios, according to EQs. 2-6 for each hydrocarbon sample. FIG. 11 depicts the correlation metric according to EQ. 21 for all pairwise combinations of the 41 hydrocarbon samples. Inspection of FIG. 11 reveals that there is both variability in the correlation between the hydrocarbon samples and that many of the hydrocarbon samples demonstrate high similarity.

Figure 12A:
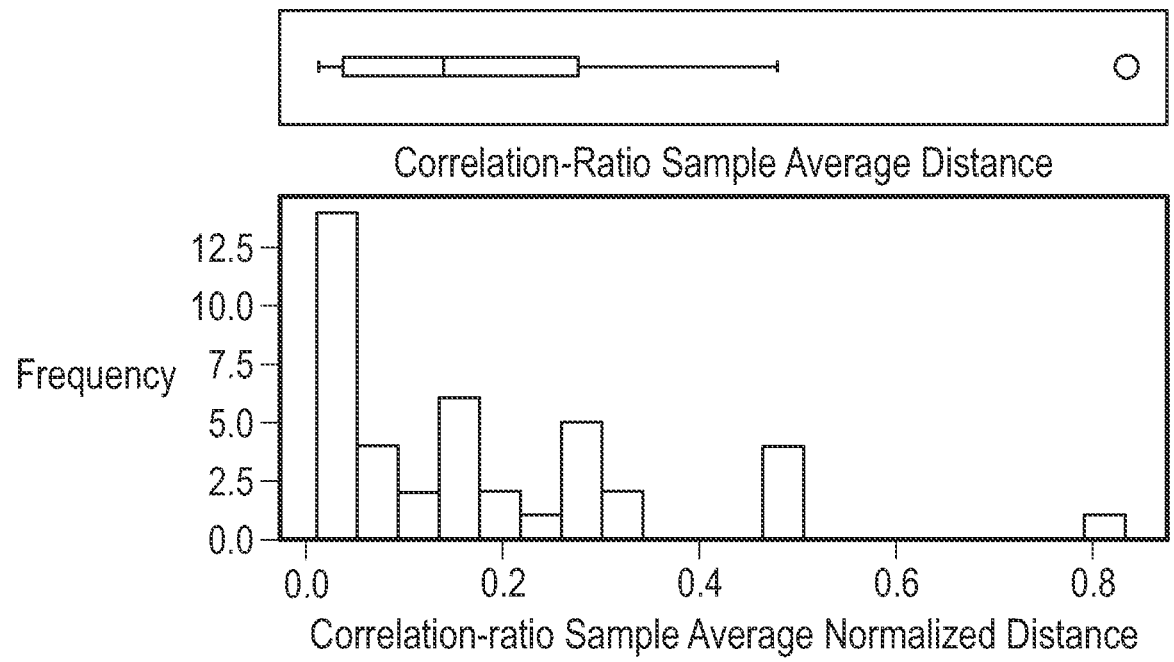
FIG. 12A depicts a frequency plot and box plot for an average dissimilarity metric in accordance with one or more embodiments.

The first dissimilarity metric was computed for all pairwise combinations of the 41 hydrocarbon samples using the correlation ratios of each hydrocarbon sample according to EQ. 15. Afterwards, using the first dissimilarity metric, the average dissimilarity metric for each sample was computed according to EQ. 20 (i.e., considering all samples). FIG. 12A depicts a frequency of the average dissimilarities of the samples and a boxplot showing the first and third quantiles.

Figure 12B:
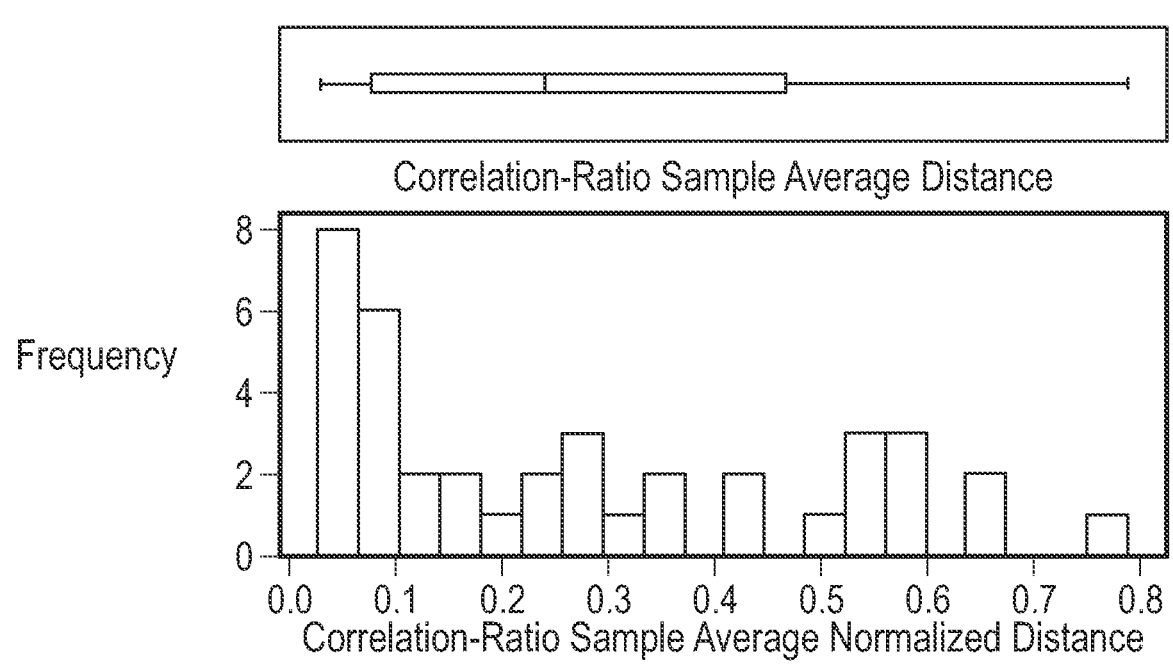
FIG. 12B depicts a frequency plot and box plot for an average dissimilarity metric in accordance with one or more embodiments.

Outlier detection (307) was performed by identifying samples with an average dissimilarity outside the range defined by EQ. 21 with a predefined scaling factor, $\beta$, of 1.5. Under this process, a single outlier was detected and found to originate from a mislabeled sample. This sample was removed from further consideration by the automated and quantitative reservoir complexity analysis system (300). As such, the remaining processes of the automated and quantitative reservoir complexity analysis system (300) are applied to 40 hydrocarbon samples. FIG. 12B depicts a frequency of the average dissimilarities of the samples and a boxplot showing the first and third quantiles of the 40 hydrocarbon samples (i.e., with the original outlier removed). Outlier detection (307) applied to the 40 hydrocarbon samples did not identify any additional outliers.

Figure 13C:
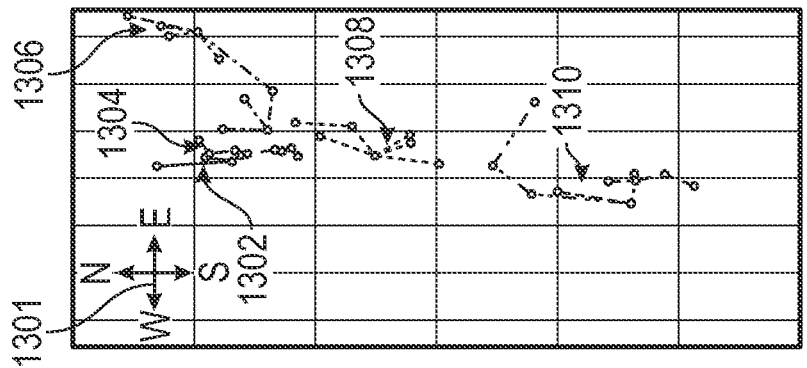
FIG. 13C depicts clusters determined using a graph-based algorithm applied to a graph in accordance with one or more embodiments.
Figure 13B:
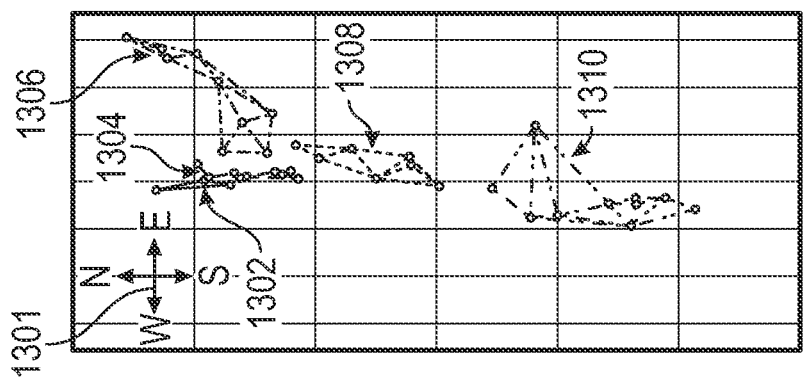
FIG. 13B depicts clusters determined using a graph-based algorithm applied to a graph in accordance with one or more embodiments.
Figure 13A:
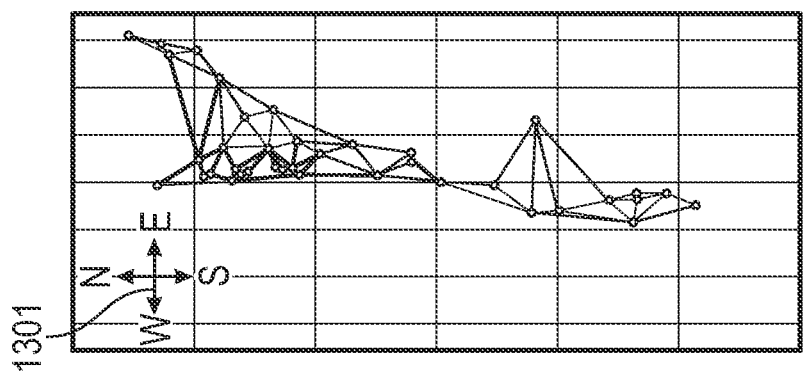
FIG. 13A depicts a graph representation of hydrocarbon oil samples in accordance with one or more embodiments.

The 40 hydrocarbon samples can be plotted according to their two-dimensional spatial location. FIG. 13A depicts the 40 hydrocarbon samples, each represented as a dot, according to their relative spatial location. The exact location, i.e., longitude and latitude, of the samples is anonymized, however, a compass rose (1301) is provided to provide cardinal orientation. Further, a graph of the 40 hydrocarbon samples was constructed using the graph constructor (302) of the automated and quantitative reservoir complexity analysis system (300). As such, edges connecting various plotted samples are likewise depicted in FIG. 13A. Finally, edge weights (or edge values) were determined using the edge value determination system (306) of the automated and quantitative reservoir complexity analysis system (300). For the present example, the first dissimilarity metric (EQ. 13) is used as the weight for each edge. The line thickness of the edges depicted in FIG. 13A is selected according to the weight assigned to the edge with thicker lines indicating greater dissimilarity.

With a graph constructed and edge values determined for the 40 hydrocarbon samples, the graph was processed using a graph-based algorithm (308) to identify clusters (or groups or partitions) of samples. Specifically, for the present case, the Clauset-Newman-Moore greedy modularity maximization algorithm was applied without simplification. The result is depicted in FIG. 13B where, as can be seen, the algorithm identified five clusters in the graph. The clusters are arbitrarily labeled the first cluster (1302), second cluster (1304), third cluster (1306), fourth cluster (1308), and fifth cluster (1310). Note that the algorithm automatically identified the complexity in the North-West area of the oil and gas field and it is partitioned to its own segments automatically (first cluster (1302) and second cluster (1304)). This is useful insight that can quickly assists geoscientists in identifying compartmentalization. Additionally, for the present case, the Clauset-Newman-Moore greedy modularity maximization algorithm with minimum spanning tree simplification was also applied to the constructed graph, with the results depicted in FIG. 13C. Again, the algorithm identified five distinct clusters, however, many of the edges were removed. The simplified result of FIG. 13C can indicate possible migration pathways when integrated with other types of data.

Figure 14A:
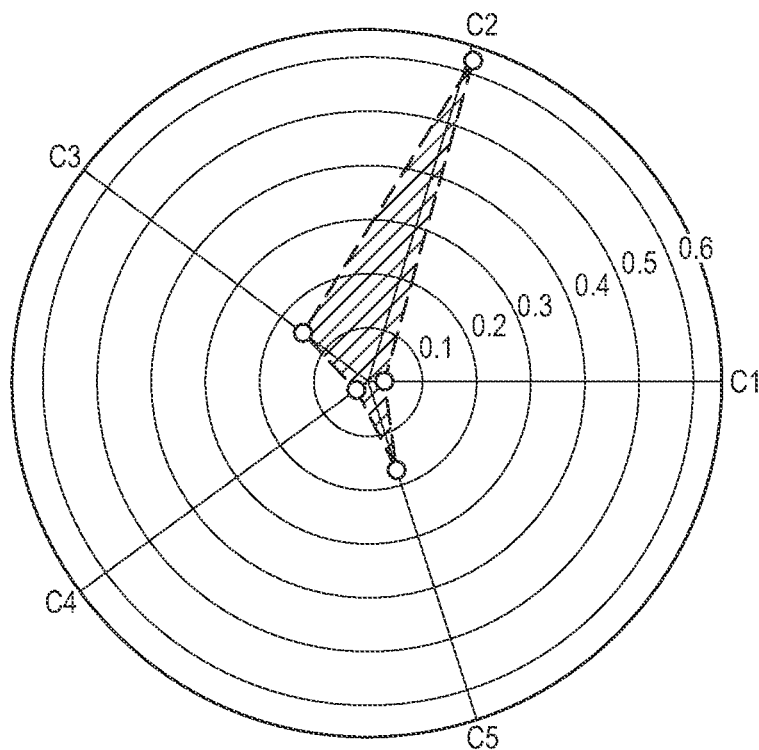
FIG. 14A depicts a star diagram of the average correlation ratios for samples in a cluster in accordance with one or more embodiments.
Figure 14B:
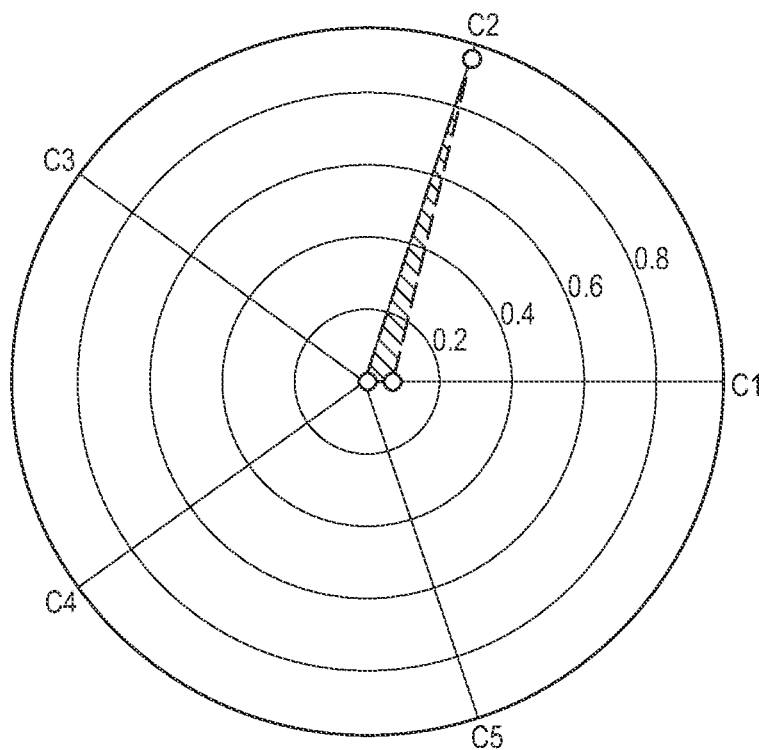
FIG. 14B depicts a star diagram of the average correlation ratios for samples in a cluster in accordance with one or more embodiments.
Figure 14C:
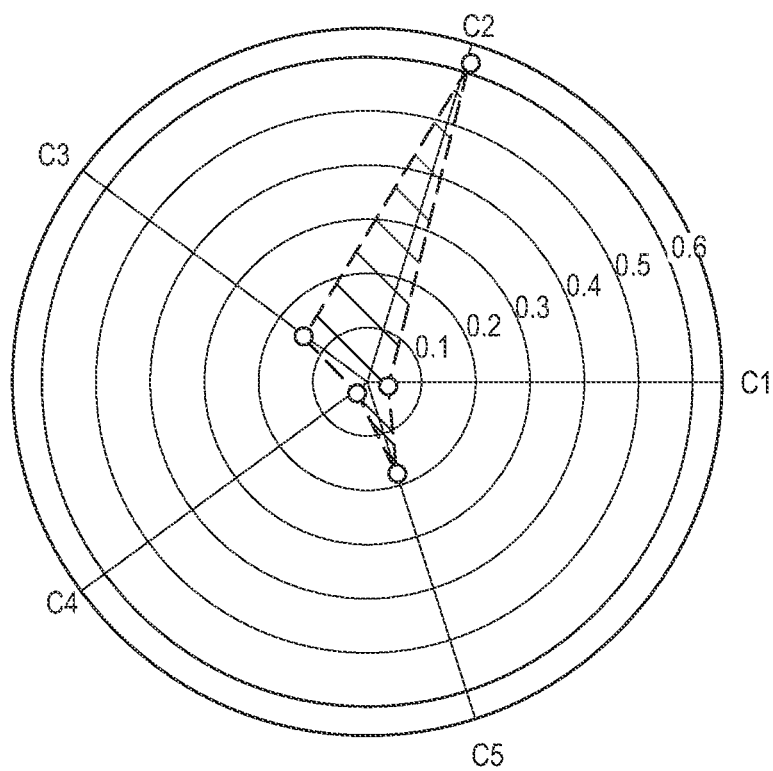
FIG. 14C depicts a star diagram of the average correlation ratios for samples in a cluster in accordance with one or more embodiments.
Figure 14D:
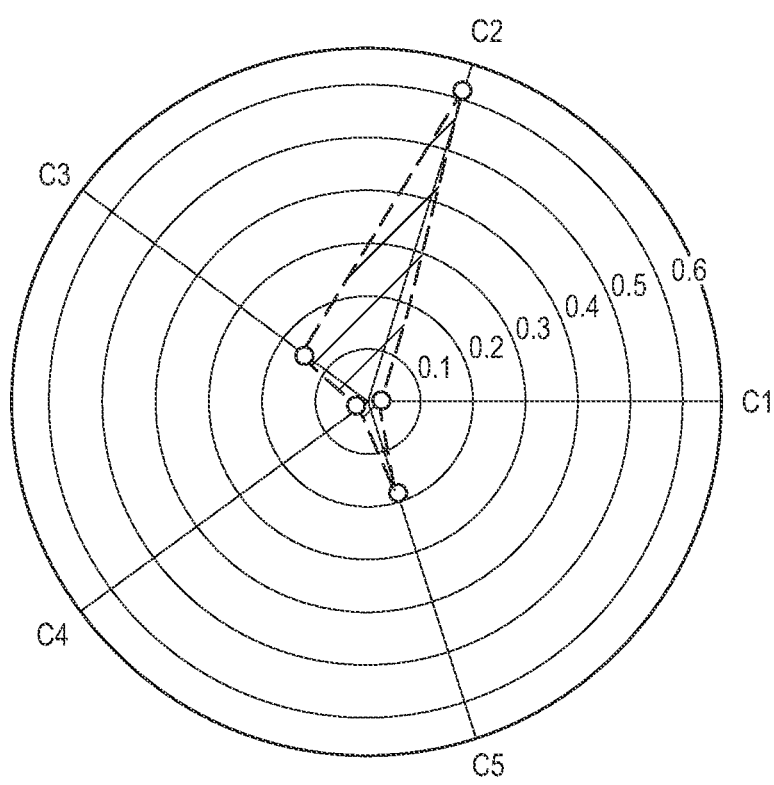
FIG. 14D depicts a star diagram of the average correlation ratios for samples in a cluster in accordance with one or more embodiments.
Figure 14E:
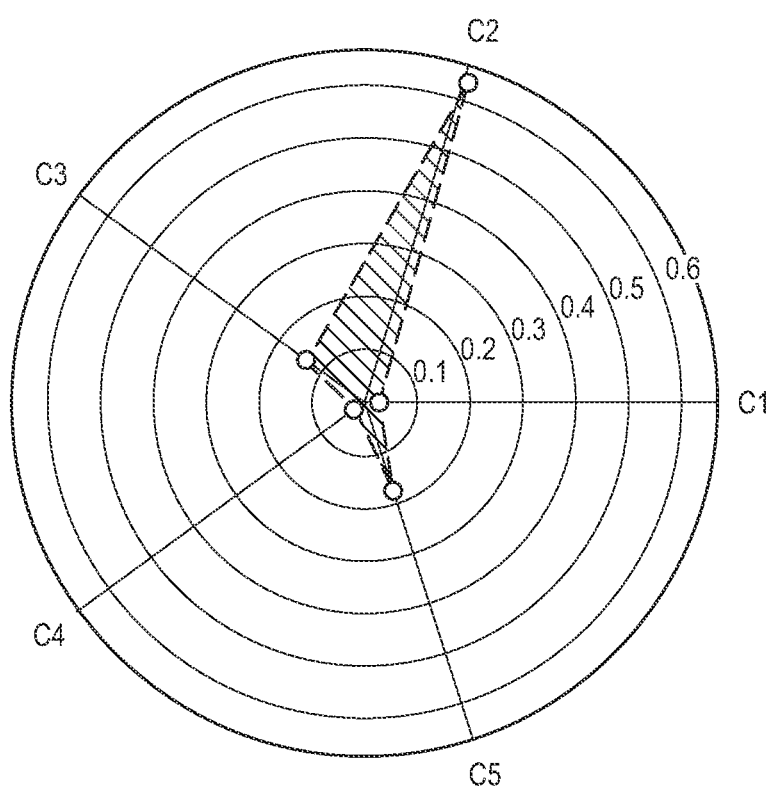
FIG. 14E depicts a star diagram of the average correlation ratios for samples in a cluster in accordance with one or more embodiments.

For each cluster, as visualized in FIG. 13B, the group correlation ratio vector, $CR^g$ for the $g^{th}$ group, was computed, where $CR^g=[=\overline{CR}_1^g, \overline{CR}_2^g, \overline{CR}_3^g, \overline{CR}_4^g, \overline{CR}_5^g]$ each $\overline{CR}_k^g$ was determined using EQ. 23. Each group correlation ratio vector was further normalized across all five clusters. FIGS. 14A through 14E depict a star diagram of the normalized group correlation vector for each of the five clusters previously determined. Specifically, FIG. 14A is a star diagram of the group correlation ratio vector for the first cluster (1302), FIG. 14B is a star diagram of the group correlation ratio vector for the second cluster (1304), FIG. 14C is a star diagram of the group correlation ratio vector for the third cluster (1306), FIG. 14D is a star diagram of the group correlation ratio vector for the fourth cluster (1308), and FIG. 14E is a star diagram of the group correlation ratio vector for the fifth cluster (1310). In one or more embodiments, the star diagrams of normalized correlation ratio vectors of different groups are qualitatively compared by a subject matter expert to determine compartmentalization or otherwise alter the subsurface model (330).

Figure 15:
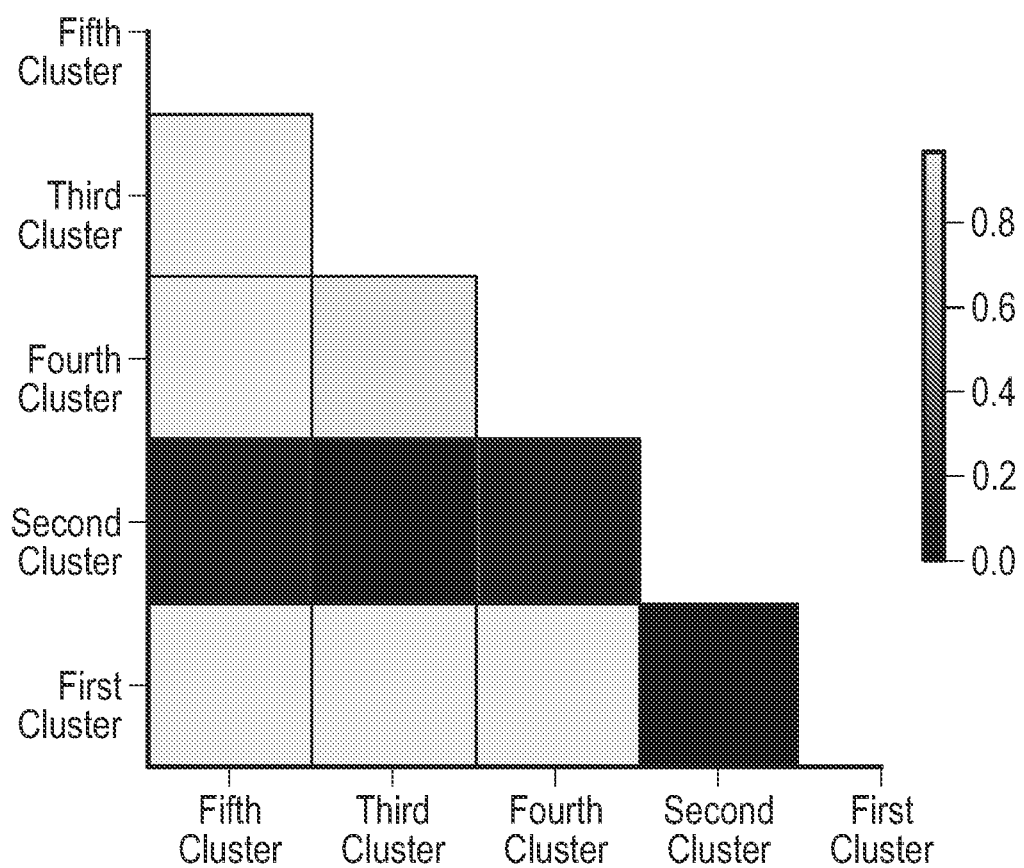
FIG. 15 depicts a correlation matrix for the average correlation ratios between clusters in accordance with one or more embodiments.

Finally, FIG. 15 visually depicts the correlation metric for each pair of clusters, where the correlation metric between any two pairs of clusters was computed according to EQ. 24. Inspection of FIG. 15 reveals that the second cluster is greatly distinguished from the other clusters.

Figure 16A:
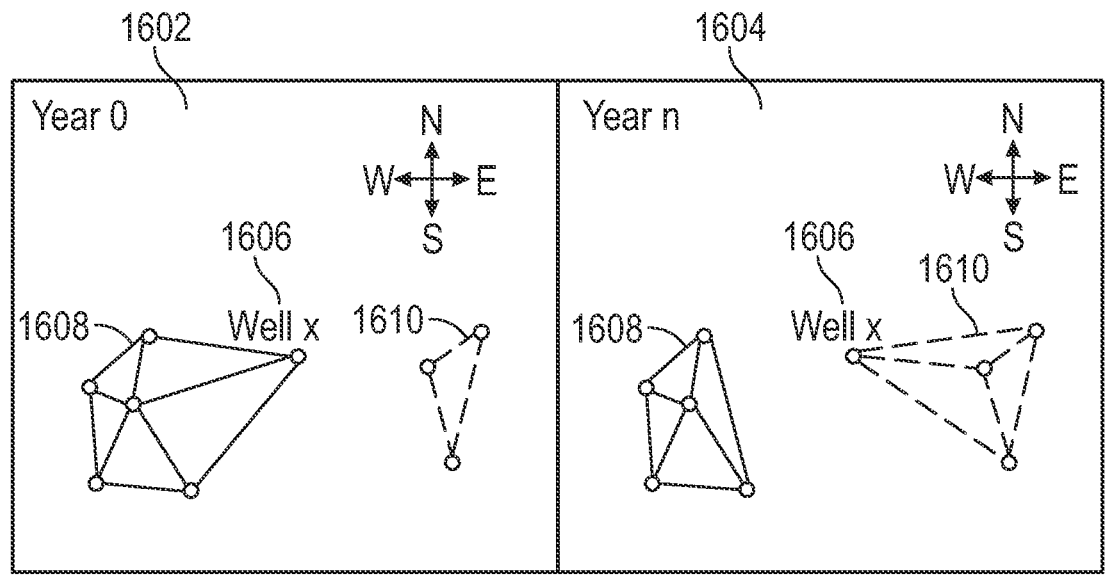
FIG. 16A depicts two different graph partitions performed on samples acquired at two different times in accordance with one or more embodiments.
Figure 16B:
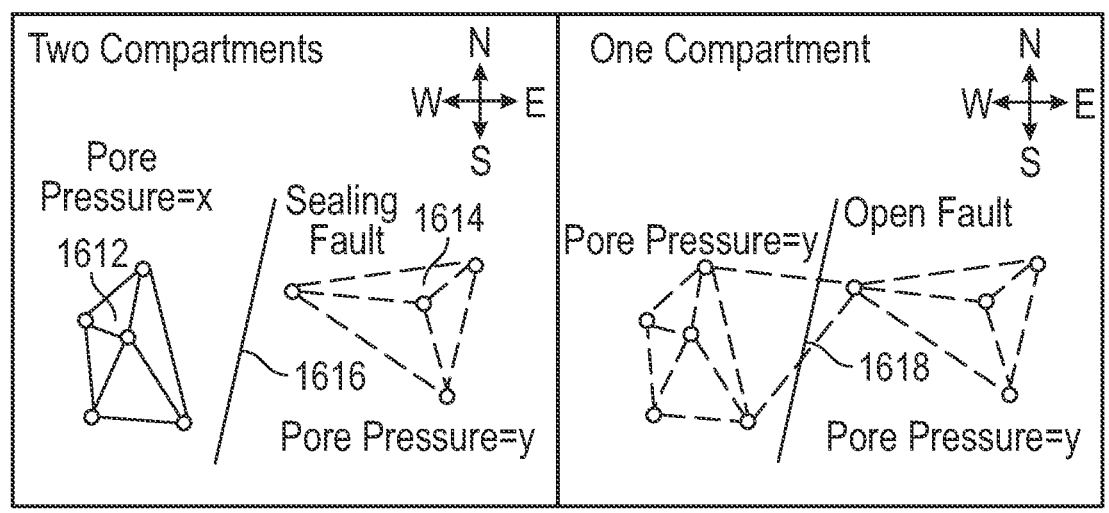
FIG. 16B depicts two different graph partitions demonstrating a sealing fault and an open fault, respectively, in accordance with one or more embodiments.

FIGS. 16A and 16B depict fictional graphs constructed according the methods and processes outlined and encompassed by the automated and quantitative reservoir complexity analysis system (300). The purpose of these graphs is to demonstrate how the graphs may be interpreted to better understand the complexities of subsurface formations and how such understanding may influence decisions regarding well placement.

FIG. 16A has a left pane and a right pane. The left pane of FIG. 16A depicts a set of samples, each collected from a well at a first time ("year 0") (1602), plotted according to their relative spatial location and partitioned into two clusters using a graph-based algorithm. The clusters are labeled as the sixth cluster (1608) and the seventh cluster (1610). As seen, in the left pane of FIG. 16A, a sample collected from a well called "Well X" (1606) belongs to the sixth cluster (1608) at the first time (1602). The right pane of FIG. 16B depicts a set of samples, each collected from the same wells at depicted in the left pane of FIG. 16A but at a second time ("year n") (1604), where the second time (1604) is n years later than the first time (1602). Again, as in the left pane, the samples in the right pane are plotted according to their relative spatial location and partitioned into two clusters using a graph-based algorithm. Similar clusters as those shown in the left pane of FIG. 16A are determined and thus the clusters depicted in the right pane of FIG. 16B retain the labels of the sixth cluster (1608) and the seventh cluster (1610). However, in the right pane of FIG. 16A, the newly collected sample from "Well X" (1606) now belongs to the seventh cluster (1610) at the second time (1604). As such, in one or more embodiments, the automated and quantitative reservoir complexity analysis system (300) is applied to samples collected from identical locations over different times to determine how hydrocarbon composition changes and/or migrates with time. This workflow includes the following steps: 1) acquire and analyze samples with a known periodicity (e.g., yearly); 2) apply the automated and quantitative reservoir complexity analysis system (300) to the samples acquired each period; 3) compare partitioning results from period to period; and 4) note the changes (e.g., a well being automatically assigned one group in one year and another group the next year would indicate that the hydrocarbon composition has changed in that well). It is emphasized that this workflow, and any of the processes of the automated and quantitative reservoir complexity analysis system (300), are not limited to hydrocarbon samples. In one or more embodiments, the time-based workflow described above is applied to water samples (rather than hydrocarbon) because hydrocarbon production and water injection might change the water composition mixture (injection and formation water proportions) relatively rapidly as injection continues.

FIG. 16B demonstrates an instance where pore pressure data is used to validate the compartmentalization of an oil and gas field. Typically, if two areas are connected, it is expected that the pore pressure gradient would be similar in the two areas, i.e., pore pressure at the same depth are similar. However, if the two areas are not connected, the pore pressure may or may not be similar and a discontinuity may exist. One mechanism to create compartmentalization is through sealed faults and so a structural interpretation (such as clusters of a graph) to identify faults is useful. The left pane of FIG. 16B depicts an instance where samples, acquired at different wells at the same time and at the same depth, once constructed into a graph and partitioned into clusters by the automated and quantitative reservoir complexity analysis system (300), are grouped into two clusters. The clusters of the left pane of FIG. 16B are labeled the eighth cluster (1612) and the tenth cluster (1614). In addition to the two clusters, it is noted that the pore pressure associated with the samples of the eighth cluster (1612) are close to a first pressure ("pressure x") whereas the pore pressure associated with the samples of the ninth cluster (1614) are close to a second pressure ("pressure y"). Thus, in view of the two determined clusters and the distinct pore pressure data between the clusters, it may be said that a sealing fault (1616) exists between the two clusters leading to compartmentalization. Thus, in the instance depicted by the left pane of FIG. 16B, at least one well will need to be drilled into each compartment to efficiently produce hydrocarbons from both sides of the sealing fault (1616). In contrast, in the right pane of FIG. 16B, only a single cluster is determined. Further, there is no significant variation in pore pressure across the samples. Consequently, it may be said that the fault in the example of the right pane of FIG. 16B, is an open fault (1618) and that there is only once compartment.

Figure 17:
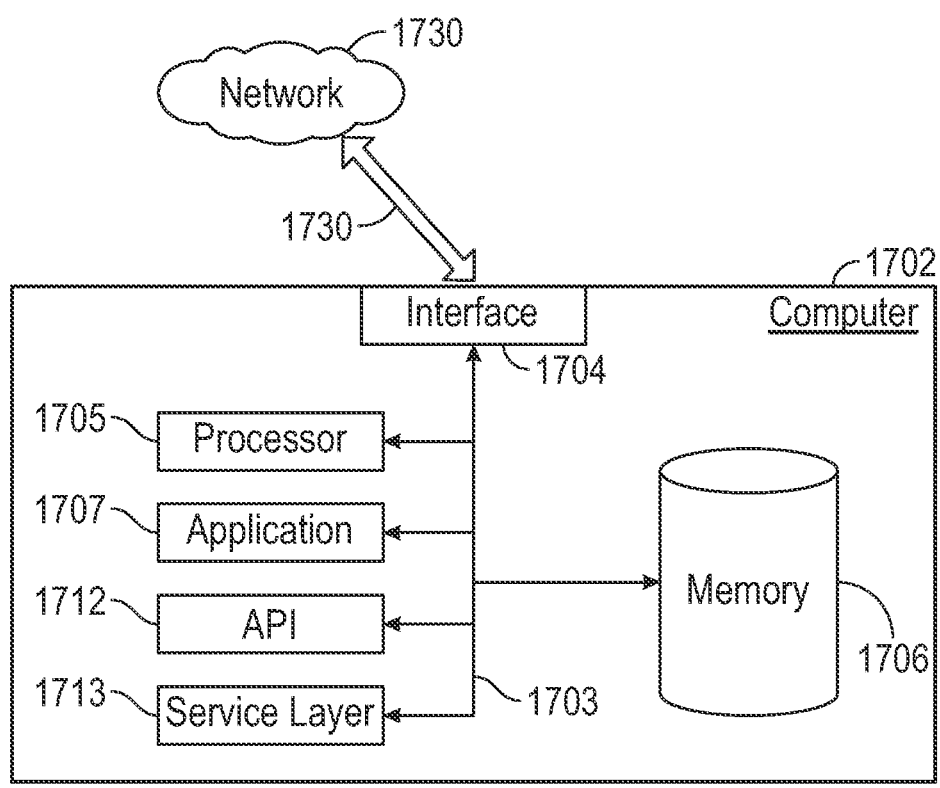
FIG. 17 depicts a system in accordance with one or more embodiments.

FIG. 17 further depicts a block diagram of a computer system (1702) used to provide computational functionalities associated with the algorithms, methods, functions, processes, flows, and procedures as described in this disclosure, according to one or more embodiments. The illustrated computer (1702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1702) may include a computer that includes an input device, such as a keypad, keyboard, touch screen, or other device that can accept user information, and an output device that conveys information associated with the operation of the computer (1702), including digital data, visual, or audio information (or a combination of information), or a GUI.

The computer (1702) can serve in a role as a client, network component, a server, a database or other persistency, or any other component (or a combination of roles) of a computer system for performing the subject matter described in the instant disclosure. In some implementations, one or more components of the computer (1702) may be configured to operate within environments, including cloud-computing-based, local, global, or other environment (or a combination of environments).

At a high level, the computer (1702) is an electronic computing device operable to receive, transmit, process, store, or manage data and information associated with the described subject matter. According to some implementations, the computer (1702) may also include or be communicably coupled with an application server, e-mail server, web server, caching server, streaming data server, business intelligence (BI) server, or other server (or a combination of servers).

The computer (1702) can receive requests over network (1730) from a client application (for example, executing on another computer (1702) and responding to the received requests by processing the said requests in an appropriate software application. In addition, requests may also be sent to the computer (1702) from internal users (for example, from a command console or by other appropriate access method), external or third-parties, other automated applications, as well as any other appropriate entities, individuals, systems, or computers.

Each of the components of the computer (1702) can communicate using a system bus (1703). In some implementations, any or all of the components of the computer (1702), both hardware or software (or a combination of hardware and software), may interface with each other or the interface (1704) (or a combination of both) over the system bus (1703) using an application programming interface (API) (1712) or a service layer (1713) (or a combination of the API (1712) and service layer (1713). The API (1712) may include specifications for routines, data structures, and object classes. The API (1712) may be either computer-language independent or dependent and refer to a complete interface, a single function, or even a set of APIs. The service layer (1713) provides software services to the computer (1702) or other components (whether or not illustrated) that are communicably coupled to the computer (1702). The functionality of the computer (1702) may be accessible for all service consumers using this service layer. Software services, such as those provided by the service layer (1713), provide reusable, defined business functionalities through a defined interface. For example, the interface may be software written in JAVA, C++, or other suitable language providing data in extensible markup language (XML) format or another suitable format. While illustrated as an integrated component of the computer (1702), alternative implementations may illustrate the API (1712) or the service layer (1713) as stand-alone components in relation to other components of the computer (1702) or other components (whether or not illustrated) that are communicably coupled to the computer (1702). Moreover, any or all parts of the API (1712) or the service layer (1713) may be implemented as child or sub-modules of another software module, enterprise application, or hardware module without departing from the scope of this disclosure.

The computer (1702) includes an interface (1704). Although illustrated as a single interface (1704) in FIG. 17, two or more interfaces (1704) may be used according to particular needs, desires, or particular implementations of the computer (1702). The interface (1704) is used by the computer (1702) for communicating with other systems in a distributed environment that are connected to the network (1730). Generally, the interface (1704) includes logic encoded in software or hardware (or a combination of software and hardware) and operable to communicate with the network (1730). More specifically, the interface (1704) may include software supporting one or more communication protocols associated with communications such that the network (1730) or interface's hardware is operable to communicate physical signals within and outside of the illustrated computer (1702).

The computer (1702) includes at least one computer processor (1705). Although illustrated as a single computer processor (1705) in FIG. 17, two or more processors may be used according to particular needs, desires, or particular implementations of the computer (1702). Generally, the computer processor (1705) executes instructions and manipulates data to perform the operations of the computer (1702) and any algorithms, methods, functions, processes, flows, and procedures as described in the instant disclosure.

The computer (1702) also includes a memory (1706) that holds data for the computer (1702) or other components (or a combination of both) that can be connected to the network (1730). The memory may be a non-transitory computer readable medium. For example, memory (1706) can be a database storing data consistent with this disclosure. Although illustrated as a single memory (1706) in FIG. 17, two or more memories may be used according to particular needs, desires, or particular implementations of the computer (1702) and the described functionality. While memory (1706) is illustrated as an integral component of the computer (1702), in alternative implementations, memory (1706) can be external to the computer (1702).

The application (1707) is an algorithmic software engine providing functionality according to particular needs, desires, or particular implementations of the computer (1702), particularly with respect to functionality described in this disclosure. For example, application (1707) can serve as one or more components, modules, applications, etc. Further, although illustrated as a single application (1707), the application (1707) may be implemented as multiple applications (1707) on the computer (1702). In addition, although illustrated as integral to the computer (1702), in alternative implementations, the application (1707) can be external to the computer (1702).

There may be any number of computers (1702) associated with, or external to, a computer system containing computer (1702), wherein each computer (1702) communicates over network (1730). Further, the term "client," "user," and other appropriate terminology may be used interchangeably as appropriate without departing from the scope of this disclosure. Moreover, this disclosure contemplates that many users may use one computer (1702), or that one user may use multiple computers (1702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
   obtaining a plurality of physical samples from one or more wells, wherein each sample is associated with spatial-temporal data;
   determining geochemical data for each sample in the plurality of physical samples;
   constructing a graph representation of the plurality of physical samples, wherein in the graph representation each sample is represented as a node and a presence of an edge between any two nodes is based on the spatial-temporal data of the plurality of physical samples;
   determining a weight for every edge in the graph representation;
   processing the graph representation with a graph-based algorithm to determine one or more clusters, wherein each of the one or more clusters includes at least one sample from the plurality of physical samples; and
   determining a wellbore plan that comprises a planned wellbore path to penetrate a hydrocarbon reservoir based on the determined clusters.

2. The method of claim 1, further comprising drilling a wellbore according to the planned wellbore path.

3. The method of claim 1, wherein each sample in the plurality of physical samples is a hydrocarbon oil sample.

4. The method of claim 3, wherein geochemical data for each sample is determined using a chromatography instrument configured to obtain light hydrocarbon measurements for a given sample.

5. The method of claim 4, further comprising determining a vector of correlation ratios for each sample in the plurality of physical samples based on light hydrocarbon measurements of each sample.

6. The method of claim 5, wherein the weight for any given edge of the graph representation is set to a first dissimilarity metric computed using the vector of correlation ratios of the nodes connected by the given edge.

7. The method of claim 1, wherein the presence of the edge between any two nodes is determined using Delaunay triangulation.

8. The method of claim 1, wherein the graph-based algorithm is the Clauset-Newman-Moore greedy modularity maximization algorithm.

9. A non-transitory computer-readable memory comprising computer-executable instructions stored thereon that, when executed on a processor, cause the processor to perform steps comprising:
   obtaining a plurality of physical samples from one or more wells, wherein each sample is associated with spatial-temporal data;
   determining geochemical data for each sample in the plurality of physical samples;
   constructing a graph representation of the plurality of physical samples, wherein in the graph representation each sample is represented as a node and a presence of an edge between any two nodes is based on the spatial-temporal data of the plurality of physical samples;
   determining a weight for every edge in the graph representation;
   processing the graph representation with a graph-based algorithm to determine one or more clusters, wherein each of the one or more clusters includes at least one sample from the plurality of physical samples; and
   determining a wellbore plan that comprises a planned wellbore path to penetrate a hydrocarbon reservoir based on the determined clusters.

10. The non-transitory computer-readable memory of claim 9, the steps further comprising transmitting a command signal to a drilling system to drill a wellbore according to the planned wellbore path.

11. The non-transitory computer-readable memory of claim 9, wherein each sample in the plurality of physical samples is a hydrocarbon oil sample.

12. The non-transitory computer-readable memory of claim 11, wherein geochemical data for each sample is determined using a chromatography instrument configured to obtain light hydrocarbon measurements for a given sample.

13. The non-transitory computer-readable memory of claim 12, further comprising determining a vector of correlation ratios for each sample in the plurality of physical samples based on the light hydrocarbon measurements of each sample.

14. The non-transitory computer-readable memory of claim 13, wherein the weight for any given edge of the graph representation is set to a first dissimilarity metric computed using the vector of correlation ratios of the nodes connected by the given edge.

15. The non-transitory computer-readable memory of claim 9, wherein the presence of the edge between any two nodes is determined using Delaunay triangulation.

16. The non-transitory computer-readable memory of claim 9, wherein the graph-based algorithm is the Clauset-Newman-Moore greedy modularity maximization algorithm.

17. A system, comprising:
   a sample characterization system configured to receive a physical sample and determine geochemical data describing the physical sample; and
   a computer configured to:
      receive geochemical data for each sample in a plurality of physical samples, wherein each sample is associated with spatial-temporal data;
      construct a graph representation of the plurality of physical samples, wherein in the graph representation each sample is represented as a node and a presence of an edge between any two nodes is based on the spatial-temporal data of the plurality of physical samples;

determine a weight for every edge in the graph representation;

process the graph representation with a graph-based algorithm to determine one or more clusters, wherein each of the one or more clusters includes at least one sample from the plurality of physical samples; and determine a wellbore plan that comprises a planned wellbore path to penetrate a hydrocarbon reservoir based on the determined clusters.

18. The system of claim 17, further comprising a drilling system configured to drill a wellbore guided by the planned wellbore path.

19. The system of claim 17, wherein the sample characterization system comprises a chromatography instrument configured to obtain light hydrocarbon measurements for the received physical sample, wherein the physical sample is a hydrocarbon oil sample.

20. The system of claim 19,
wherein the computer is further configured to determine a vector of correlation ratios for each sample in the plurality of physical samples based on light hydrocarbon measurements of each sample,
wherein the presence of the edge between any two nodes is determined using Delaunay triangulation, and
wherein the weight for any given edge of the graph representation is set to a first dissimilarity metric computed using the vector of correlation ratios of the nodes connected by the given edge.

* * * * *